(12) United States Patent
Horst et al.

(10) Patent No.: US 11,373,191 B2
(45) Date of Patent: Jun. 28, 2022

(54) SYSTEMS, DEVICES, COMPONENTS AND METHODS FOR DYNAMICALLY DISPLAYING PERFORMANCE SCORES ASSOCIATED WITH THE PERFORMANCE OF A BUILDING OR STRUCTURE

(71) Applicant: United States Green Building Council (USGBC), Washington, DC (US)

(72) Inventors: Scot Horst, Kutztown, PA (US); Mahesh Ramanujam, Durham, NC (US); Dhruv Gami, Pittsburgh, PA (US); S. Richard Fedrizzi, Syracuse, NY (US)

(73) Assignee: USGBC, Washington, DC (US)

( * ) Notice: Subject to any disclaimer, the term of this patent is extended or adjusted under 35 U.S.C. 154(b) by 2066 days.

(21) Appl. No.: 14/213,990

(22) Filed: Mar. 14, 2014

(65) Prior Publication Data

US 2014/0279608 A1    Sep. 18, 2014

Related U.S. Application Data

(63) Continuation-in-part of application No. 13/843,811, filed on Mar. 15, 2013, now abandoned, and a continuation-in-part of application No. 29/450,278, filed on Mar. 15, 2013, now Pat. No. Des. 721,724.

(51) Int. Cl.
*G06Q 10/06* (2012.01)
*G06Q 30/00* (2012.01)
*G06Q 10/04* (2012.01)

(52) U.S. Cl.
CPC ........... *G06Q 30/018* (2013.01); *G06Q 10/04* (2013.01); *G06Q 10/0639* (2013.01)

(58) Field of Classification Search
CPC .................. G06Q 50/08; G06Q 10/06312
See application file for complete search history.

(56) References Cited

U.S. PATENT DOCUMENTS

| | | |
|---|---|---|
| 6,157,943 A | 12/2000 | Meyer |
| 6,487,457 B1 | 11/2002 | Hull et al. |
| 6,598,056 B1 | 7/2003 | Hull et al. |
| 6,993,403 B1 | 1/2006 | Dadebo et al. |
| 7,031,880 B1 | 4/2006 | Seem et al. |

(Continued)

OTHER PUBLICATIONS

Shaikh, P. H., Bin Mohd Nor, N., Nallagownden, P., Elamvazuthi, I., & Ibrahim, T. (2014). A review on optimized control systems for building energy and comfort management of smart sustainable buildings. Renewable & Sustainable Energy Reviews (Year: 2014).*

(Continued)

*Primary Examiner* — Maria C Santos-Diaz
(74) *Attorney, Agent, or Firm* — Woods Patent Law, P.C.

(57) ABSTRACT

Described and disclosed herein are various embodiments of methods and systems configured to calculate, store and display building or structure performance data, information or scores corresponding to a particular building or structure. In one embodiment, a central web server ("CWS") is configured to operate in conjunction with, and to communicate with, a plurality of remote LEED dynamic displays ("LDPs") or dashboards. In one embodiment, the LDPs or dashboards are configured to display building performance scores calculated by the CWS for the particular building or structure associated with a given LDP or dashboard.

11 Claims, 36 Drawing Sheets

(56) References Cited

U.S. PATENT DOCUMENTS

| | | |
|---|---|---|
| 7,103,452 B2 | 9/2006 | Retsina |
| 7,356,548 B1 | 4/2008 | Culp et al. |
| 7,383,148 B2 | 6/2008 | Ahmed |
| 7,548,833 B2 | 6/2009 | Ahmed |
| 7,548,970 B2 | 6/2009 | Labedz et al. |
| 7,557,729 B2 | 7/2009 | Hubbard et al. |
| 7,567,844 B2 | 7/2009 | Thomas et al. |
| 7,822,806 B2 | 10/2010 | Frank |
| 8,027,809 B2 | 9/2011 | Brown |
| 8,078,431 B2 | 12/2011 | Brown |
| 8,103,465 B2 | 1/2012 | Brzezowski et al. |
| 8,396,740 B1 | 3/2013 | Watson |
| 8,489,243 B2 | 7/2013 | Fadell et al. |
| 8,510,255 B2 | 8/2013 | Fadell et al. |
| 8,511,576 B2 | 8/2013 | Warren et al. |
| 8,577,505 B2 | 11/2013 | Foslien et al. |
| 8,600,556 B2 | 12/2013 | Nesler et al. |
| 8,615,326 B2 | 12/2013 | Filbeck et al. |
| 8,615,381 B2 | 12/2013 | Brown |
| 8,645,495 B2 | 2/2014 | Johnson et al. |
| 8,655,830 B2 | 2/2014 | Mackay |
| D721,724 S | 1/2015 | Horst et al. |
| 2003/0078677 A1 | 4/2003 | Hull et al. |
| 2004/0239494 A1 | 12/2004 | Kennedy et al. |
| 2005/0200474 A1 | 9/2005 | Behnke |
| 2007/0219645 A1 | 9/2007 | Thomas |
| 2008/0046388 A1 | 2/2008 | Budike |
| 2009/0125283 A1 | 5/2009 | Conover |
| 2010/0107076 A1 | 4/2010 | Grohmnan |
| 2010/0217651 A1* | 8/2010 | Crabtree ............ G06Q 10/00 705/37 |
| 2010/0283606 A1 | 11/2010 | Tsypin et al. |
| 2010/0286937 A1* | 11/2010 | Hedley ............... G06Q 50/06 702/60 |
| 2010/0318200 A1 | 12/2010 | Foslien et al. |
| 2010/0324956 A1* | 12/2010 | Lopez ............... G06F 17/5004 705/7.37 |
| 2010/0332044 A1* | 12/2010 | Mclean ............. G06Q 10/06 700/291 |
| 2012/0084063 A1 | 4/2012 | Drees et al. |
| 2012/0095730 A1 | 4/2012 | Krebs et al. |
| 2012/0203562 A1 | 8/2012 | Krebs et al. |
| 2013/0035992 A1* | 2/2013 | Silverman ......... G06Q 30/0233 705/14.1 |
| 2013/0074180 A1 | 3/2013 | Chim et al. |
| 2013/0134962 A1* | 5/2013 | Kamel ............... G06Q 50/06 324/103 R |
| 2013/0174190 A1 | 7/2013 | Ramaswamy et al. |
| 2013/0311437 A1 | 11/2013 | Stluka et al. |
| 2013/0325377 A1 | 12/2013 | Drees et al. |
| 2014/0031989 A1 | 1/2014 | Bergman et al. |
| 2014/0031991 A1 | 1/2014 | Bergman et al. |
| 2014/0040998 A1 | 2/2014 | Hsieh |
| 2014/0058806 A1 | 2/2014 | Guenette et al. |
| 2014/0207693 A1 | 7/2014 | Horst et al. |

OTHER PUBLICATIONS

Intel. "Intel NUC board D54250WYB and D340010WYB, Technical Product Specification," Nov. 2013, Order No. H18263-003, pp. 1-78.
U.S. Appl. No. 61/756,441, filed Jan. 24, 2013, Scot Horst et al.
EP Srch Rprt EP1416038.3, dated Jul. 17, 2014, Scott Horst/USGBC.
EP Srch Rprt EP1416038.3, dated May 14, 2014, Scot Horst/USGBC.
EP 94(3) Comm EP1416038.3, dated Apr. 24, 2017, Scot Horst/USGBC.
EP Srch Rprt EP1416038.3, dated Jul. 17, 2014, Scot Horst/USGBC.
EP Srch Rprt EP14160380, dated Jul. 10, 2014, Scot Horst/USGBC.
EP 94(3) Comm EP14160380, dated Apr. 20, 2017, Scot Horst/USGBC.

* cited by examiner

LEED NOTIFICATION ON OCCUPANT DESKTOP DASHBOARD

FIG. 12 LEED OCCUPANT DASHBOARD MAIN SCREEN

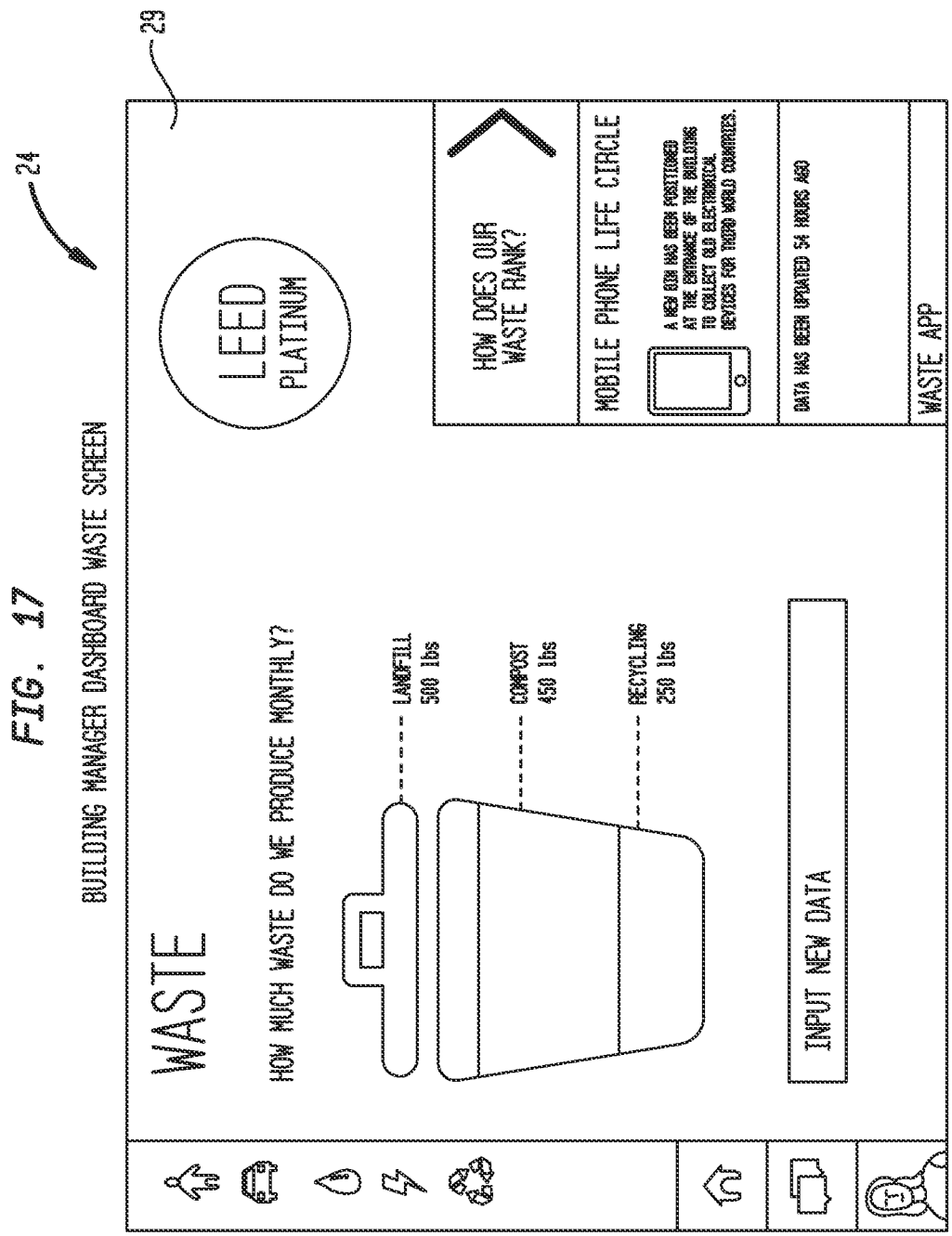
FIG. 17 BUILDING MANAGER DASHBOARD WASTE SCREEN

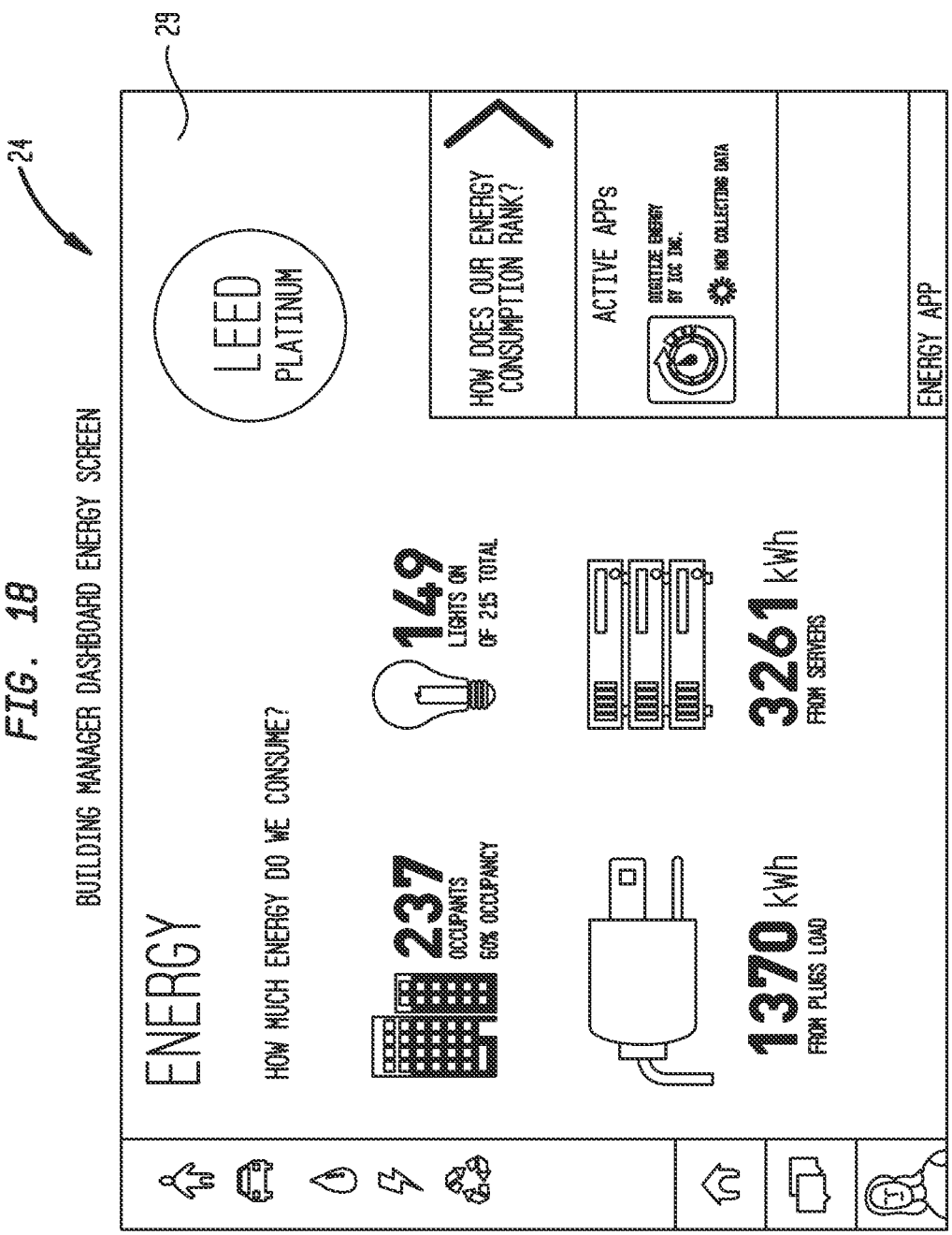

FIG. 19

BUILDING MANAGER DASHBOARD NOTIFICATION SCREEN

HELPDESK
2 NEW NOTIFICATIONS

CREATE NEW NOTIFICATION

| FROM | FLOOR | MESSAGE | CATEGORY | PRIORITY | | |
|---|---|---|---|---|---|---|
| SAM FOSTER 12:57 PM | 7 | Hello Donald, this is Sam from the finance department. The sink in the bathroom close to the printer is leaking and needs to be repaired as soon as possible. Thanks, Sam | REPAIR | | ⬇ | ➡ |
| KARIN CULLER 12:42 PM | 5 | Hi, I was wondering if it would be possible to lower the temperature on the 5th floor, because it seems to be really hot. Thanks for the help. Karin | TEMPERATURE OPTIMIZATION | | ⬇ | ➡ |
| LAUREN GREEN 11:36 AM | 2 | Hey Donald, how are you doing? We are experiencing some problems with lighting on our floor. Can you help us with that? Really appreciated. Lauren Green | LIGHT MALFUNCTION | | ⬇ | ➡ |
| BEAU TRONCIA 11:12 AM | 4 | Hey man, here on the 4th floor we are having problems with the thermostat. Anything you can do about it? Stop by for a coffee when you have some time. Long time we haven't seen you on this floor. Beau | THERMOSTAT MALFUNCTION | | | ➡ |
| JANE DOE 10:48 AM | 5 | Hello, I'm Jane Doe. I'm a new employee so I need to activate my office card. Is it possible to do it today? Best. | KEY ACTIVATION | | ⬇ | |

       

FIG. 20
SENSORS, SURVEY AND ANALOG INPUT

THE LEED RECERTIFICATION PROGRAM REQUIRES BUILDING TO REGULARLY COLLECT DATA ABOUT THEIR FIVE PERFORMANCE INDICATORS. EACH BUILDING CAN CHOSE FROM A VARIETY OF INPUT METHODS THAT SUIT THEIR CIRCUMSTANCES, FROM SIMPLE MANUAL INPUT OF ANALOG DATA, TO OCCUPANT SURVEYS, TO THE INSTALLATION OF AUTOMATED SENSORS.

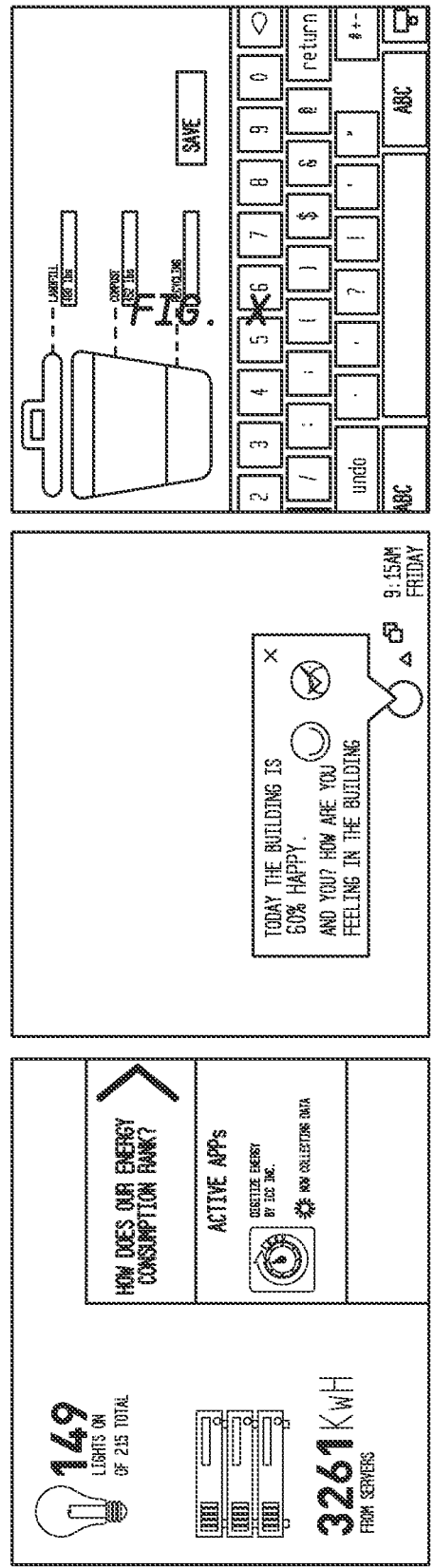

SENSORS 38
AUTOMATICALLY COMMUNICATE DATA TO THE LEED BOX

SURVEYS 36
COLLECT OCCUPANT'S FEEDBACK

ANALOG INPUT 34
FROM THE BUILDING MANAGER, SUCH AS FOR WASTE AUDIT OR ENERGY CONSUMPTION.

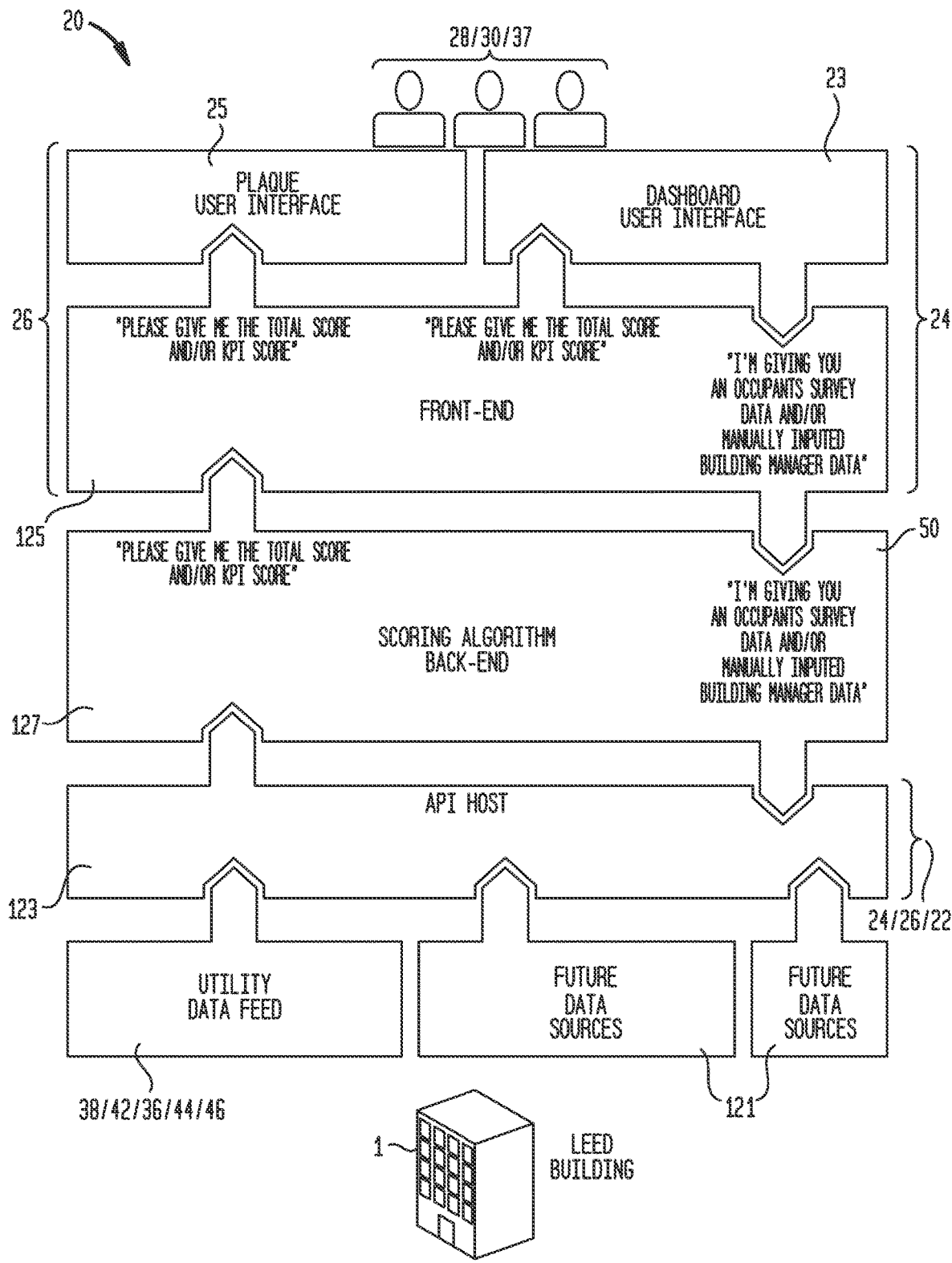

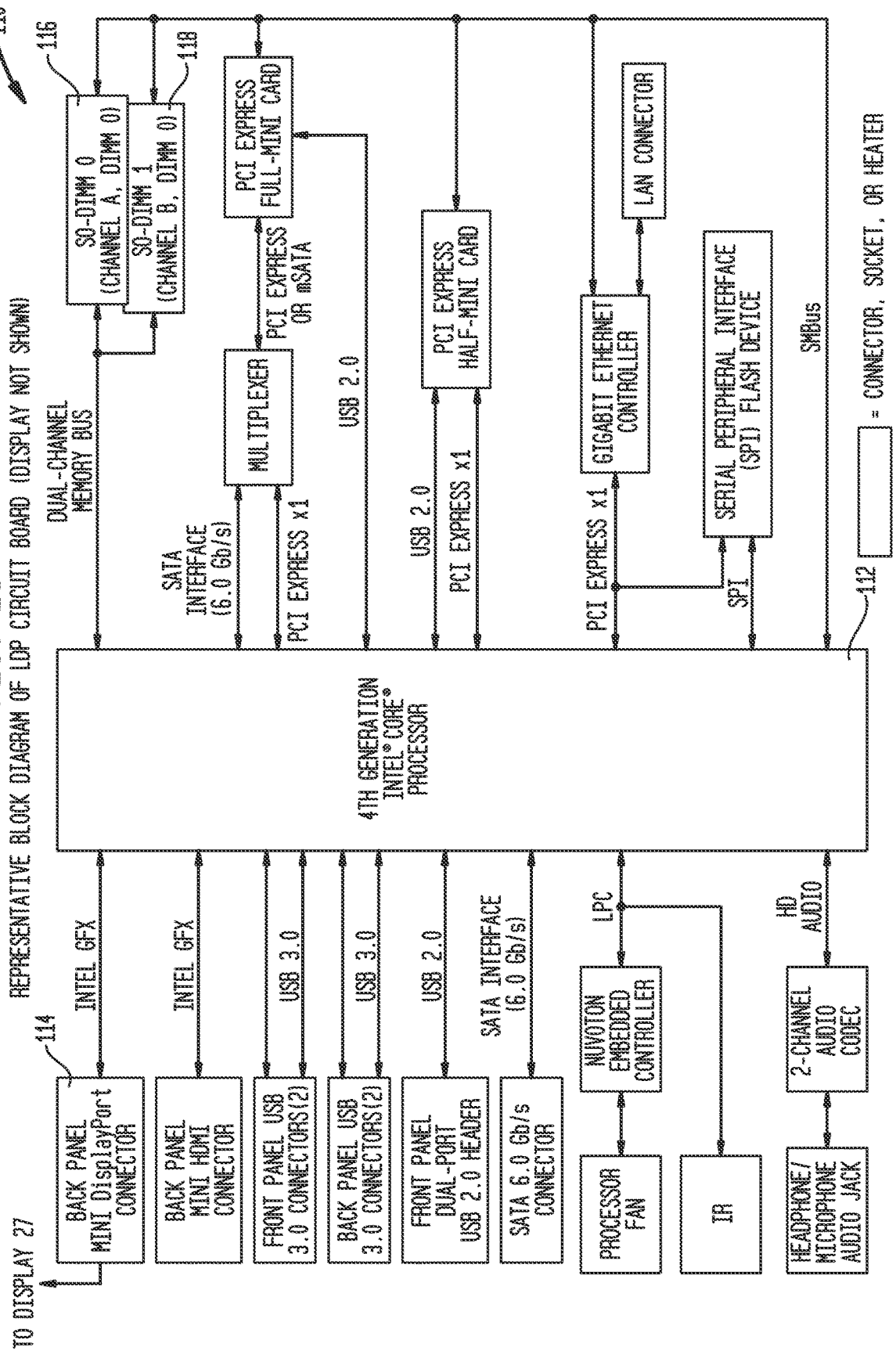

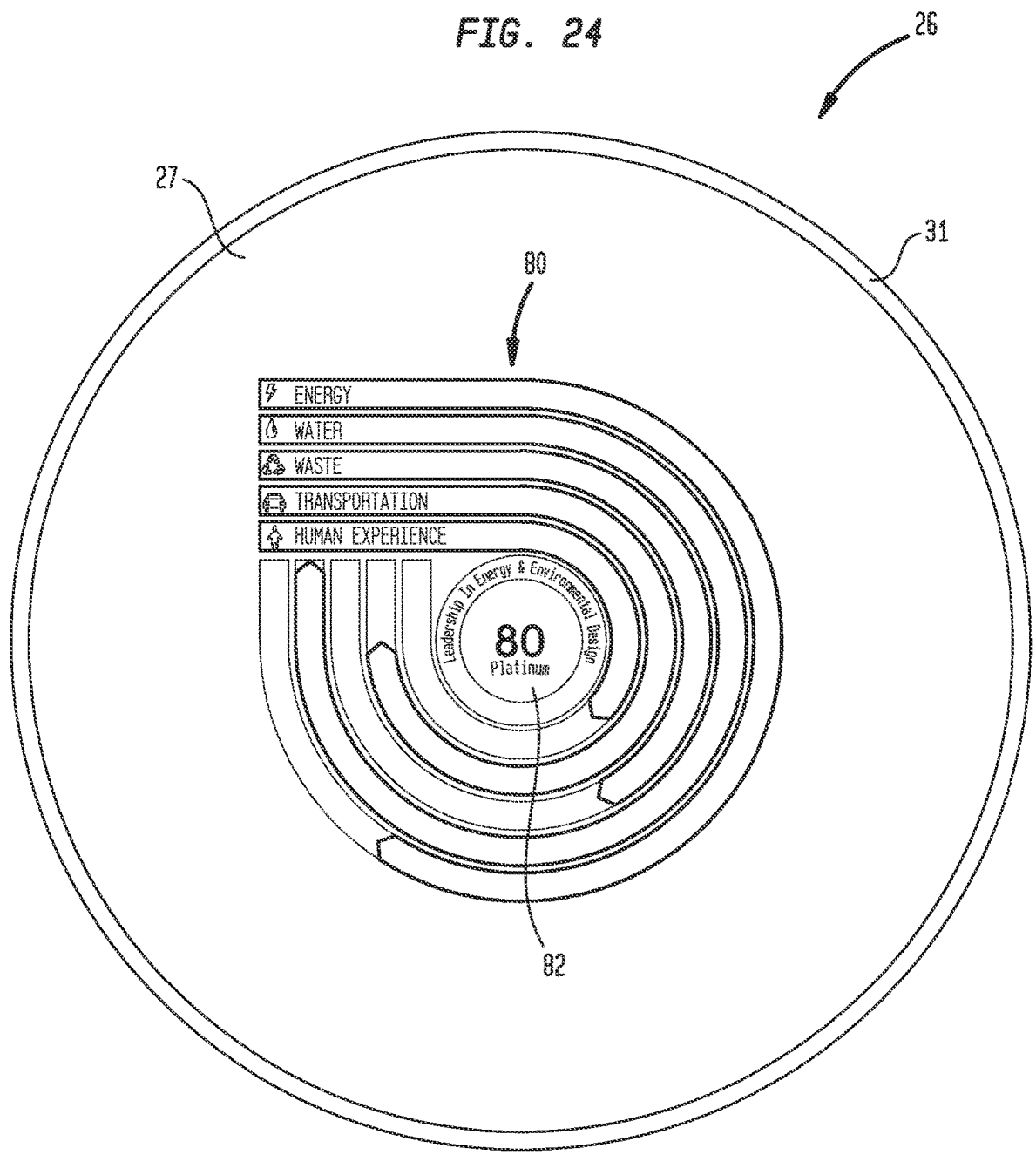

SYSTEMS, DEVICES, COMPONENTS AND METHODS FOR DYNAMICALLY DISPLAYING PERFORMANCE SCORES ASSOCIATED WITH THE PERFORMANCE OF A BUILDING OR STRUCTURE

RELATED APPLICATIONS

This application is a continuation-in-part of, and claims priority and other benefits from, U.S. Utility patent application Ser. No. 13/843,811 entitled "Systems, Devices, Components and Methods for Monitoring, Certifying and/or Recertifying the Performance of a Budding or Structure" to Horst et al. filed on Mar. 15, 2013, which is hereby incorporated by reference herein in its entirety. This application is also a continuation-in-part of, and claims priority and other benefits from, U.S. Design patent application Ser. No. 29/450,278 entitled "Ornamental Design for Devices for Monitoring, Certifying and/or Recertifying the Performance of a Building or Structure" to Horst et al. filed on Mar. 15, 2013, which is also hereby incorporated by reference herein in its entirety. U.S. Provisional Patent Application Ser. No. 61/756,441 entitled "Ornamental Design and Systems, Devices, Components and Methods for Monitoring, Certifying and/or Recertifying the Performance of a Building or Structure" to Horst et al. filed Jan. 24, 2013 is further hereby incorporated by reference herein in its entirety.

FIELD OF THE INVENTION

Various embodiments of the inventions disclosed and described herein relate to systems, devices, components and methods for calculating, storing, distributing and/or displaying building or structure performance data and scores.

BACKGROUND

The Leadership in Energy and Environmental Design (LEED®) program is a building certification process developed by the U.S. Green Building Council (USGBC®). USGBC is a nonprofit organization that promotes sustainable budding practices through LEED. LEED® has become the most widely used and recognized program of its kind in the world, providing building owners and operators a framework to identify, implement and measure green building design and operations. With fifty thousand projects in one hundred thirty five countries, LEED certifies 1.7 million square feet of green building space every day.

LEED evaluates a building across a range of criteria including Sites, Energy, Water, Materials, Resources and Indoor environmental quality. There are several LEED systems to address many different issues. In LEED for new construction, certification of a building may be performed following construction and before it is occupied. In LEED for Existing Buildings: Operations and Maintenance, certification is performed after one year of energy data along with other LEED credit information on how the building is being operated and managed. Following initial certification, existing buildings are recertified over a performance period that is to be no longer than five years.

Currently, recertification occurs based on guidelines and LEED credits provided through USGBC. What is needed is a building and structure monitoring, certification and/or re-certification process that is more automated, more accurate, quicker, and that is capable of providing improved building or structure performance data on an on-going or regular basis. What is also needed is a way to provide and display building performance scores and other information to users.

SUMMARY

In one embodiment, there is provided a device configured to display at least one of building or structure performance data and building or structure performance scores associated therewith, the data and scores corresponding to a predetermined building or structure within which the device is mounted, with which the device is associated, or to which the device is operably connected. The device comprises at least one processor, first storage means for storing the budding or structure performance data and the budding or structure performance scores, the first storage means being operably connected to or included in the processor, second storage means for storing display programming code or instructions corresponding to at least one of the building or structure performance data and the building or structure performance scores, the second storage means being operably connected to or included in the processor, and a display operably connected to the processor. The performance data or performance scores comprise at least three of water data, energy data, human experience data, transportation data, and waste data, and the device, including the processor, the first storage means, the second storage means, and the display, are configured to visually show on the display to a building or structure user or manager at least the performance scores.

In another embodiment, there is provided a central web server ("CWS") configured to operate in conjunction with a remote device configured to display at least one of building or structure performance data and building or structure performance scores associated with such date, the data and scores corresponding to a predetermined building or structure within which the device is mounted, with which the device is associated, or to which the device is operably connected. The CWS comprises means for storing the building performance data and building performance scores associated with the predetermined building or structure, means for updating or calculating the building performance data and building performance scores associated with the predetermined building or structure, and means for transferring at least one of the building performance data and the building performance scores to the remote device via the internet in response to an authorized request generated by the remote device and communicated to the CWS via the internet. The CWS is configured to authorize the validity of the request from the remote device before permitting the building performance data and the building performance scores to be transferred to the remote device in response to the request.

In yet another embodiment, there is provided a building performance scoring system. The system comprises a central web server ("CWS") configured to operate in conjunction with a remote device configured to display at least one of building or structure performance data and building or structure performance scores associated with such data, the data and scores corresponding to a predetermined building or structure within which the device is mounted, with which the device is associated, or to which the device is operably connected, the CWS comprising means for storing the building performance data and the building performance scores associated with the predetermined building or structure, means for updating or calculating the building performance data and building performance scores associated with the predetermined building or structure, and means for transferring at least one of the building performance data and the building performance scores to the remote device via the internet in response to an authorized request generated by the device and communicated to the CWS via the internet, and the remote device comprises at least one processor, first storage means for storing at least one of the building or structure performance data and the building or structure performance scores, the first storage means being operably connected to or included in the processor, second storage means for storing display programming instructions corresponding to at least one of the building or structure performance data and the building or structure performance scores, the second storage means being operably connected to or included in the processor, and a display operably connected to the processor. The performance data or performance scores comprise at least three of water data or scores, energy data or scores, human experience data or scores, transportation data or scores, and waste data or scores, and the device, including the processor, the first storage means, the second storage means, and the display, are configured to visually show on the display to a building or structure user or manager at least the performance scores.

In a still further embodiment, there is provided a method of displaying building performance scores on a dynamic plaque or dashboard, the building performance scores corresponding to a predetermined building or structure within which the dynamic plaque or dashboard is mounted, with which the dynamic plaque or dashboard is associated, or to which the dynamic plaque or dashboard is operably connected. The method comprises generating a request for building performance score information in the dynamic plaque or dashboard, sending the request for the building performance score information via the internet from the dynamic plaque or dashboard to a remote central web server (CWS), authorizing, in the CWS, the request for the building performance score information from the dynamic plaque or dashboard, following authorization of the request for the building performance score information by the CWS, at least one of retrieving the building performance score information from and calculating the building performance score information in the CWS, where the building performance score information corresponds to the predetermined building or structure, sending the building performance score information from the CWS to the dynamic plaque or dashboard via the internet, loading the building performance score information into a memory or processor of the dynamic plaque or dashboard, and displaying performance scores corresponding to the building performance score information on a display of the dynamic plaque or dashboard.

Further embodiments are disclosed herein or will become apparent to those skilled in the art after having read and understood the specification and drawings hereof.

BRIEF DESCRIPTION OF THE DRAWINGS

Different aspects of the various embodiments will become apparent from the following specification, drawings and claims in which:

FIGS. 11 through 20 show several different embodiments of visual displays and information that may be provided by system 20 to one or more of the general public, users, occupants, and building managers;

FIG. 21 shows a Platform Stack Diagram illustrating several components in system 20;

FIG. 23 shows one embodiment of hardware system 110;

FIG. 24 shows one embodiment of LDP 26 having displayed on display 27 thereof an overall performance score 82 associated with a specific building or structure 1;

The drawings are not necessarily to scale. Like numbers refer to like parts or steps throughout the drawings, unless otherwise noted.

DETAILED DESCRIPTIONS OF SOME EMBODIMENTS

Figure 1:
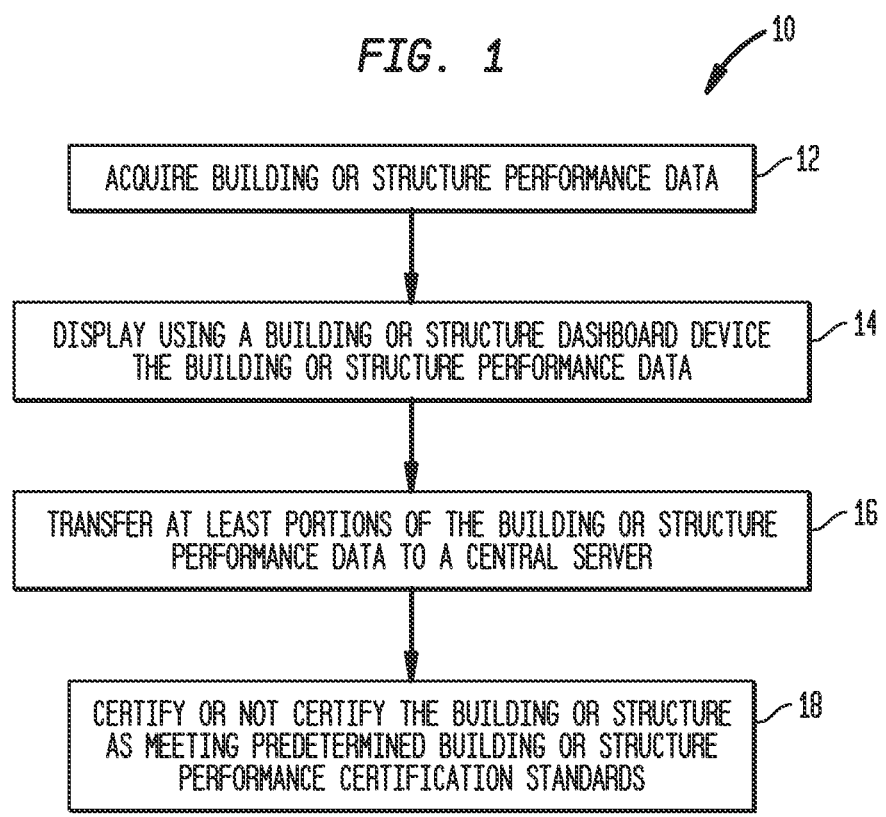
FIG. 1 shows a method 10 of monitoring, certifying, and/or recertifying the performance of a building or structure.

Described herein are various embodiments of systems, devices, components and methods relating to systems, devices, components and methods for monitoring, certifying, and/or recertifying the performance of a building or structure.

Buildings are not static, and represent a combination of events that are constantly changing. These events may include new construction, renovation, a new tenant moving into a new floor or out of another. New maintenance contracts come in to being, or are changed from daytime to nighttime. Weather changes, people act differently in different buildings, and so on. Certification of the greenness of a building needs to better reflect the living nature of a building. This reflection can better guide behavior than a static certification. A static certification can have many benefits when design and construction are certified. But these benefits are limited when it comes to the question of how a building is actually being used. The situation is similar to that of automobiles. In the United States, new automobiles are certified to be capable of attaining a certain mileage. This certification of potential miles per gallon varies greatly once the automobile is in real use. In the same way that an automobile dashboard can guide the behavior of a driver, performance based LEED recertification program may be employed to reflect the actual conditions and behaviors of building occupant in a building or structure, and used to improve performance data associated with the building or structure.

As explained above, LEED certification for existing buildings reflects the life of a building through a recertification program. This program currently applies only to buildings that have entered the LEED system through the LEED for Existing Buildings: Operation and Maintenance program. The present specification and drawings describe and disclose various embodiments of a performance based LEED or other building or structure certification and recertification program and how it may be applied to existing LEED-certified buildings. According to one such embodiment, all buildings or structures, once they have been constructed, become existing buildings and therefore need to recertify on a regular basis. In a recertification program, buildings can be re-certified based on performance categories rather than LEED credits. A score is created based on one or more algorithms that reflect an actual LEED or other score as closely as possible. According to one embodiment, such a score may be created to reflect five basic performance categories:

1. Human Experience: Including indoor air quality, carbon dioxide measurements in the air, occupancy rates, occupant satisfaction, absentee rates, etc.
2. Transportation: Including commuting methods and distances to equate to vehicle miles traveled or a carbon dioxide equivalent
3. Water: The use of water in the space, in equipment for processes in the building such as sinks for feeding, cleaning or water cooled cooling towers and on the site including irrigation.
4. Energy: The use of energy in and related to the building. The energy score will be based on building type, building occupancy rate and weather data. This will allow the score to be normalized across a wide variety of locations and situations.
5. Waste: The amount of waste generated and diverted to compost and recycling or other uses.

Healthy buildings and structures have healthy input and feedback mechanisms. In a typical building, input and feedback tends to function based on a "complaint-o-meter". People may say "I'm too hot" or "I'm too cold," or the response is non-existent or untimely. The methods and systems described herein create an ecosystem of input and feedback tools, and engage several basic types of stakeholders: the general public, owners, managers, users and building occupants.

With any type of building or structure certification or recertification program, it is difficult to know if the outcome will continue into the future. A performance based LEED or other recertification program for existing buildings can be focused on the outcomes of the actions taken to create a green space. These outcomes require ongoing and continuing work to be meaningful. Designing a building or structure for low energy use may make no or little difference if the occupants of the building do not use the space the way in the intended manner. An energy saver function in a lighting system is worthless if it is overridden. Performance based recertification of a building or structure can provide validation of whether designed systems and human behavior are working, and continuing to work, to reduce a building's impact in the main ways outlined above.

In one embodiment, a LEED or other ecosystem is a system and method that combines interrelating ideas, mechanisms and tools, more about which is now said. Referring now to FIG. 1, there is shown one embodiment of a method 10 of monitoring, certifying, and/or recertifying the performance of a building or structure comprising the following steps. At step 12, building or structure performance data corresponding to the building or structure are acquired, where the performance data comprise at least three of water data, energy data, human experience data, transportation data, and waste data. At step 14, at least one building or structure dashboard device is employed to display the performance data to at least one of a building or structure user and a building or structure dashboard manager. At step 16, at least portions of the performance data are transferred to a server or a central server. On the basis of the transferred data, at step 18 the building or structure is certified or not certified as meeting predetermined building or structure performance certification standards.

The method shown in FIG. 1 has many possible variants and embodiments. For example, method 10 may further comprise acquiring the building or structure performance data using at least one building or structure data acquisition device and corresponding sensors and data inputs located in the building or structure, where the data acquisition device is operably connected to the dashboard device. The building data acquisition device may comprise a variable air volume control device or system, and the user or dashboard manager may input building or structure performance data into the dashboard device. The user or dashboard manager may also input building or structure performance data into the data acquisition device. A unique IP address is preferably associated with the building or structure so that its location and other data associated therewith may be satisfactorily identified by the system. At least one of a mobile phone, a desktop computer, a laptop computer, a tablet computer, a personal data assistant (PDA) and a touchscreen device may be employed as the dashboard device.

Water data may be provided to the system with at least one water meter or monitor located in the building or structure that is operably connected to at least one of the data acquisition device and the dashboard device. Energy data may be provided to the system with at least one energy meter or monitor located in the building or structure that is operably connected to at least one of the data acquisition device and the dashboard device. Waste data may be provided to the system with at least one of: (a) a waste meter or monitor located in the building or structure and operably connected to at least one of the data acquisition device and the dashboard device, and (b) waste data inputs entered by the user or dashboard manager into the building data acquisition device or the dashboard device. Human experience data may be provided to the system with at least one of; (a) a human experience meter or monitor located in the building or structure and operably connected to at least one of the data acquisition device and the dashboard device, and (b) human experience data inputs entered by at least one of the user, the dashboard manager and an occupant of the building or structure into the building data acquisition device or the dashboard device. Transportation data may be provided to the system by at least one of: (a) a transportation meter or monitor located in the building or structure and operably connected to at least one of the data acquisition device and the dashboard device, and (b) transportation data inputs entered by at least one of the user, the dashboard manager and an occupant of the building or structure into the building data acquisition device or the dashboard device.

According to one embodiment, performance data are transferred to the server or central server via the internet from, for example, the data acquisition device and/or the dashboard device. At least portions of the performance data may be provided to the building or structure data acquisition device or to the dashboard device wirelessly.

A score for performance data received from the building or structure may be generated by the system. By way of example, at least one of indoor air quality, carbon dioxide levels, occupancy rates, occupant satisfaction, and absentee rates may be included in the human experience data when determining the score. At least one of commuting methods, commuting distances, and carbon dioxide equivalents associated with the commuting methods, and carbon dioxide equivalents associated with the commuting distances may be included in the transportation data when determining the score. At least one of water use in the building or structure space, water use for equipment located in the building or structure, water use in cooling towers associated with the building or structure, and irrigation associated with the building or structure may be included in the water data when determining the score. At least one of energy use in the building or structure, a type of the building or structure, a construction method or design associated the building or structure, an occupancy rate of the building or structure, and weather data associated with the building or structure may be included in the energy data when determining the score. At least one of an amount of waste generated in the building or structure, an amount of waste diverted to compost from the building or structure, and an amount of waste recycled from the building or structure may be included in the waste data when determining the score. The score may be employed to determine whether the building or structure meets the predetermined performance certification standards, to certify or not certify the building or structure as meeting the predetermined performance certification standards, and/or to subsequently re-certify or not re-certify the building or structure as meeting the predetermined performance certification standards.

Figure 2:
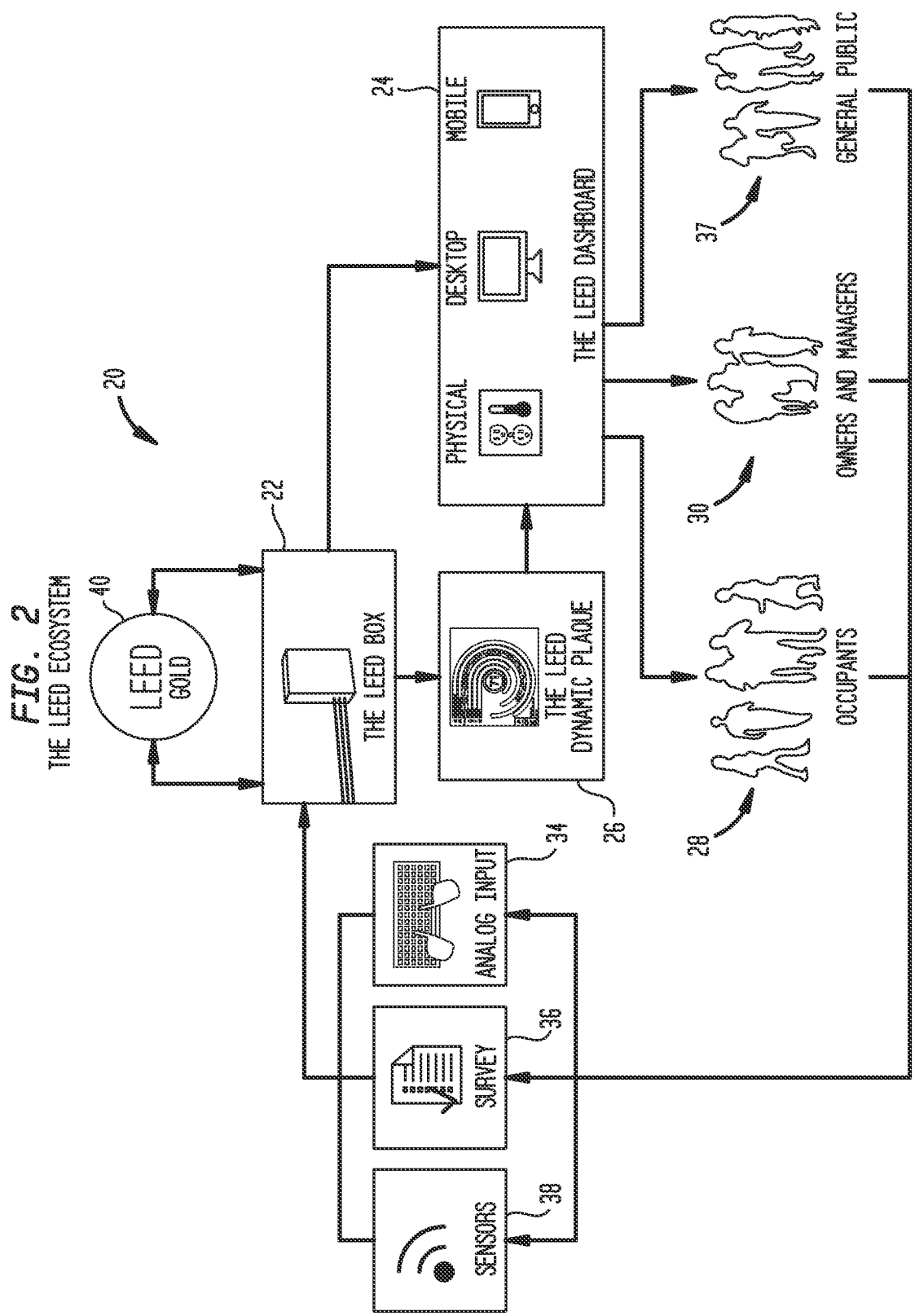
FIG. 2 shows one embodiment of a monitoring, certifying, and/or recertifying system 20.

FIG. 2 shows one embodiment of a system 20 for monitoring, certifying, and subsequently recertifying performance of a building or structure. As shown in FIG. 2, at least one building or structure data acquisition device 22 is configured to receive input signals from a plurality of sensors 38 located in or around the building or structure. The input signals represent building or structure performance data corresponding to the building or structure. According to one embodiment, the performance data may comprise at least three of water data, energy data, human experience data, transportation data, and waste data. At least one dashboard device 24 and/or 26 is operably connected to data acquisition device 22, and dashboard device 24 and/or 26 is configured to display the performance data to at least one of a building or structure user 28 and/or 37 or to a building or structure dashboard manager 30.

Figure 3:
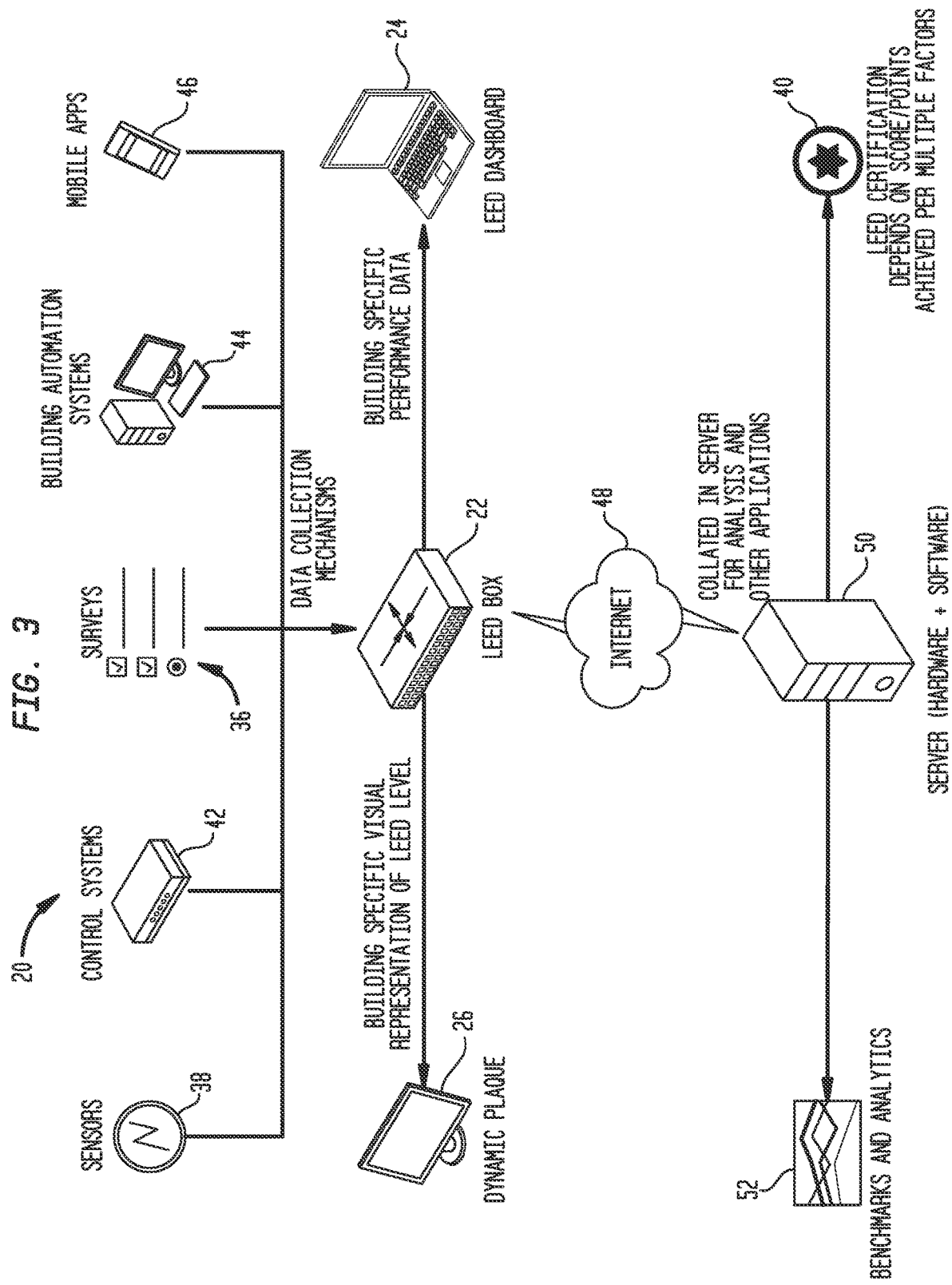
FIG. 3 shows another embodiment of a monitoring, certifying, and/or recertifying system 20.

As further shown in FIGS. 2 and 3, data acquisition device 22 and/or dashboard device 24 and/or 26 is further configured to receive building or structure performance input data from at least one of the user and the manager 30. As shown in FIG. 3, computer and internet means 24, 22 and 48 may be employed to transfer at least portions of the building or structure performance data to server 50, which is configured and programmed to at least one of store the transferred data for subsequent analysis and to certify or not certify the building or structure as meeting the performance certification standards. Processing and analysis of the performance data need no be carried out by server 50, and may instead be performed by a different computer.

In one embodiment, server 50 is a cloud-hosted central server that collects data from devices 22, 24 and/or 26, and performs analysis on the data received therefrom. Such analyses include benchmark analysis using anonymous data from various devices 22, 24 and/or 26 in different building or structures, which information can then be provided back to specific buildings about their performance relative to other buildings. Server 50 may also be configured to calculate a score for LEED Certification based on multiple factors, and to make such information available via various mechanisms, including a web application, mobile apps and web services. Such information may also be sent back to the LEED box for display as plaque 26 or any other dashboard device 24.

Continuing to refer to FIGS. 2 and 3, data acquisition device 22 may be configured to receive building or structure performance input data from the user or dashboard manager. In one embodiment, data acquisition device 22 comprises a variable air volume control device or system. As described above, dashboard device 24 and/or 26 may comprise one or more of a mobile phone, a desktop computer, a laptop computer, a tablet computer, a personal data assistant (PDA) and a touchscreen device as the dashboard device.

Still referring to FIGS. 2 and 3, and in one embodiment, data acquisition device 22 is a "LEED Box™" that is placed in the building or structure. Data acquisition device box 22 may be configured to provide an IP address for the building, and to collect information from building management systems as well as analog inputs, and send such information to a server.

Figure 4:
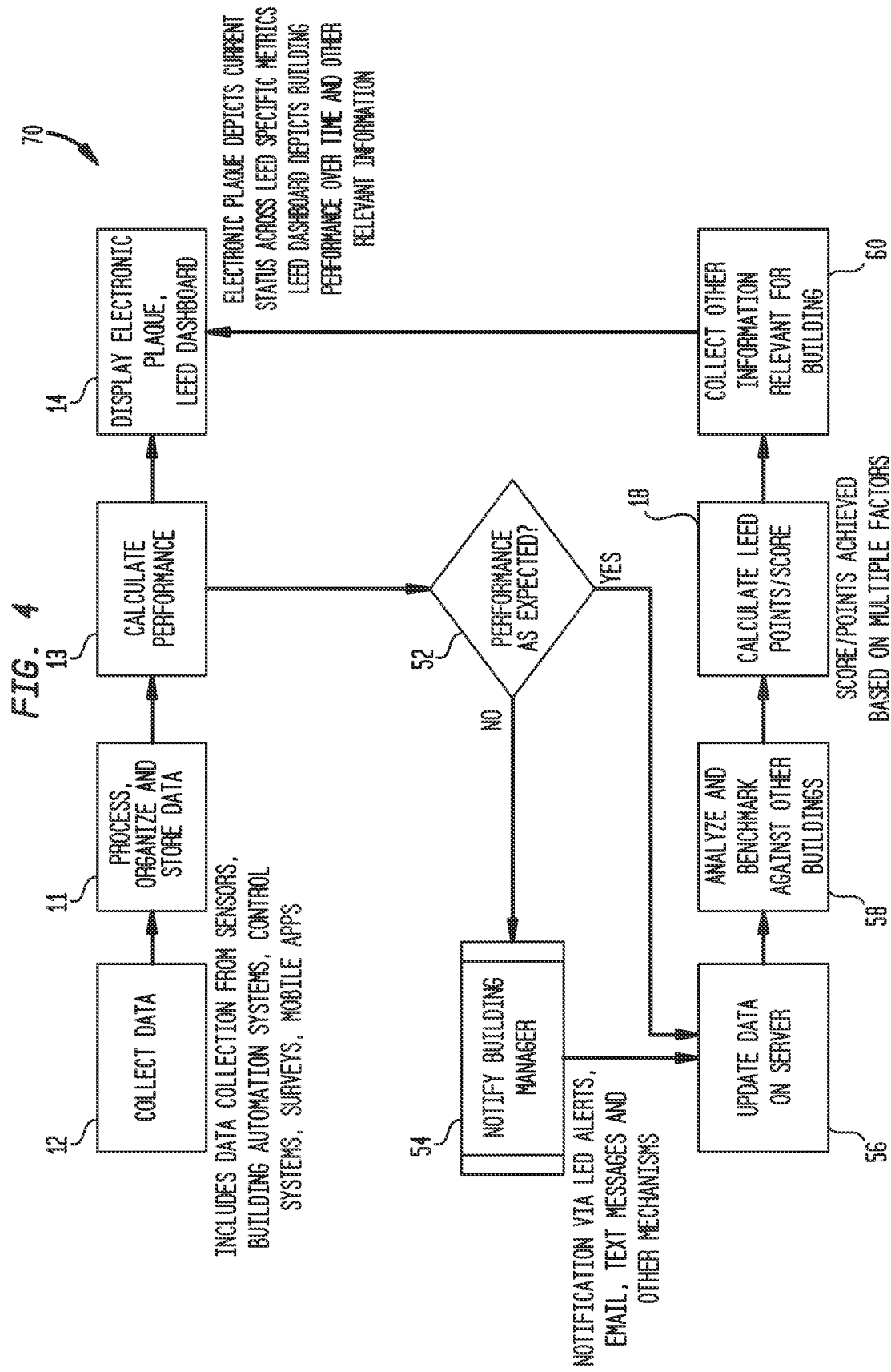
FIG. 4 shows one embodiment of a method 70 according to which data acquisition device 22 may be operated.
Figure 5:
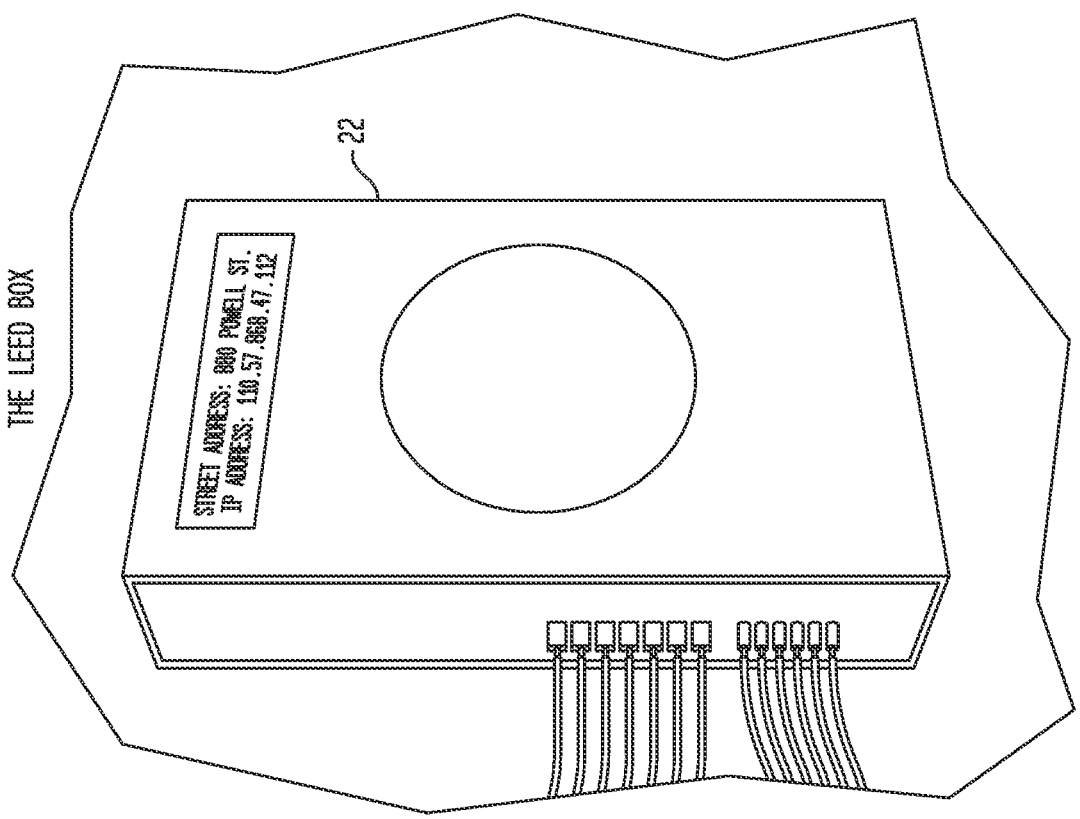
FIG. 5 shows one embodiment of a data acquisition device 22.

FIG. 4 shows one embodiment of a method 70 according to which data acquisition device 22 (e.g., a LEED box) may be operated. (In other embodiments, dashboard devices 24 or 26 may be similarly configured and operated as shown in FIG. 4.) FIG. 5 shows one embodiment of a data acquisition device 22, which in some embodiments is a LEED box. Data acquisition device 22 is a physical device placed on-site in, around or near the building that is to be monitored and/or certified. Device 22 may be configured to provide a visual display corresponding to a LEED or other certification level, and may also include functionality and displays similar to, or the same as, dashboard device 24. Both such visual displays may be combined into the same display, or can be configured as multiple displays. Device 22 is also connected to server 50 over a stable Internet connection. In one embodiment, device 22 uploads building specific data to server 50 and receives updates and relevant information for display on the building's one or more device dashboards 24. Device 22 is a hardware solution that can be configured to serve as a central point for data capture, analysis and information dissemination regarding the specific building or structure with which it is associated. Device 22 may comprise one or more of data input and output components, a geographic location component, a communication component, and so on.

Through integration with existing building automation systems, control systems and sensors installed in the building or structure, device 22 can capture incoming data about the ongoing performance of the building as they relate to LEED or other certification programs. Device 22 can also be configured to accept input data through custom survey or manual data entry tools, and/or mobile and web applications in use by building occupants, users and/or managers. By way of example, such tools can be employed to capture data the automation of which is difficult, such as emotional responses, daily occupant activity, and the like.

In one embodiment, device 22 and/or dashboard 24 performs basic analyses of captured data and information based on pre-defined algorithms, and then displays on plaque 26 the analyzed information, historical trends, alerts, or other information provided by server 50. If device 22 and/or dashboard device 24 determines that building performance has fallen below expected levels, or if anomalies are discovered in the data, device 22 and/or dashboard device 24 can be configured to send notifications to the building manager to take action. Device 22 and/or dashboard device 24 can also be configured to periodically upload acquired or collected data to server 50 for further analysis, comparison, benchmarking and determination of LEED or other scores or certification levels.

Device 22 can be configured to provide several main functions, including providing a unique IP address for a project, the building, or both, thereby permitting projects and buildings to be tracked in similar fashion around the world. Device 22 can also serve as a main data collection point, and to contain software configured to provide performance and other data back to server 50 for review. Device 22 may also be connected to a building management software system, if it exists, which then provides at least some of the data inputs thereto. If a building management software system does not exist, device 22 can function as a collection point for digital and analog inputs from the building manager and occupants, and from the plurality of building sensors described above.

In one embodiment, server 50 is configured to perform advanced analytics, and executes an algorithm that determines LEED or other scores or certification levels, Information on server 50 may be accessed via a web interface, mobile apps or web services. Sufficient security and access controls are built into system 20 to keep each building's data private and accessible only to authorized users.

Referring now to FIGS. 2, 3, 4 and 5, and according to one embodiment, input to system 20 may come from any of a variety of directions. Complex and large structures with building management systems can be configured to connect to, and operate in conjunction with, device 22, 24 or 26. One concept associated with device 22 is rooted in the idea that buildings are alive, and like other living entities, they change over time. To truly measure and gauge how "green" a building might be, ongoing or regular measurements of its performance are required.

According to one embodiment, device 22, 24 or 26 comprises four core components—on-site hardware, server hardware, server software, and applications.

On-Site Hardware Examples

An integrated device 22, 24 or 26 that is physically placed inside a building and connected to data sources such as building management systems, system controls, and the like.

Any of devices 22, 24 and 26 may comprise one or more of:
Data Input component: connectivity to building systems and communication channels. Integration with other systems on-site.
Data output component: connectivity to screens/monitors to view device output
Data storage component: Local hard disk to persist collected data
Communications component: connectivity to a remote server over any viable communication channel like Wireless, Ethernet, Bluetooth, Cellular etc.
Location component: A GPS based location identification component
Notification component: An alert mechanism built using LED lights, sound alerts, electronic communication alerts or a combination of all
Analytical component: In-built analytical capabilities to perform local analysis of data being collected, perform diagnostics and predictive analysis for potential issues
Remote access component: Software and hardware capability to access the device from a remote location to perform maintenance, service or data interchange
Security component: Controls built to lock down device and prevent unauthorized access Server Hardware Examples Hardware associated with server 50 may comprise:
a Cloud hosted and data-center hosted servers in a public-private hybrid configuration
Load balanced, secure access point into the pool of servers with a firewall to put servers in a DMZ (Demilitarized Zone)
Scalable hardware with hot-swappable RAM and Hard Disks
Replicated across various global locations using CDN (Content Distribution Networks)

Server Software Examples

A server based software system capable of collecting data from various channels, including but not limited to device 22, dashboard 24, plaque 26, or other hardware components, or via data uploads, manual data entry, integration with other software, mobile data entry, and so on.
Software for server 50 may comprise:
Distributed operating system—A cloud-enabled operating system layer to enable real-time scaling of capacity by adding additional resources to the server(s).
Persistence component—A Big Data enabled database with the ability to store data for relational, columnar, real-time, time-series and distributed access.
N-tier architecture built using a multi-tenant framework—Software-as-a-Service oriented user access, developed to use a common backend for multiple clients. Ability to separate data storage by client.
Responsive UI—A user Interface developed using front-end technologies like HTML5, CSS3, Javascript, Jquery, Responsive toolkits, Twitter Bootstrap etc. for universal access to the data across all devices, platforms and operating systems.
Business Logic component—A data processing module including various algorithms for analyzing building data, trends, statistical analysis, heuristics, semantics, search models, taxonomies, etc.
Security component—An in-built security model for privacy, data access, enforcing access models using access control lists, role-based access control, two-factor authentication, encrypted data storage using 3DES/AES/Blowfish or better methods and keys larger than 2048 bytes.
Communication component—Messaging, notification and alert mechanisms built into the tool to notify users of various system events, updates, and data input requirements.

Examples of "Apps" or Applications

LEED or Other Dashboard 24 or 26—An application designed to provide a visualized narrative of a building's performance at a given point in time, or over a period of time. The dashboard may be interactive and allow a user or manager to obtain further details about specific performance metrics. Dashboard 24 or 26 can be configured to consolidate all information gathered and analyzed by system 20 and present same in the context of the building's performance. Dashboard 24 or 26 may also be visible on a user portal, mobile app, or as a dedicated display in the building.

Data Collection—System 20 can be configured to collect data from various sources, channels and mechanisms, such as building automation systems, control systems, web applications, social media, mobile applications, survey tools, third-party applications, and the like.

Information Channel—System 20 can be configured to provide aggregated news, updates and other information relevant to building occupants. Such information may include co-branded messaging, advertisements and sponsored messages.

Education—System 20 can be configured to provide educational insights to users or occupants based on the building's and/or their current performance, and suggest methods to improve building performance, reduce waste, and optimize efficiency.

Emergency Services—System 20 can be configured to alert emergency services such as the police, local security, fire services and medical services when an emergency situation arises.

Security—System 20 can be configured to collect data for use by local, state or federal agencies.

Data Collection Mechanisms

These can include automated and manual methods of data collection. Building Automation Systems, Control Systems and Sensors collect data over time and are integrated for data input into the LEED box. Manual data collection can be configured via Survey tools and Mobile apps.

Figure 6:
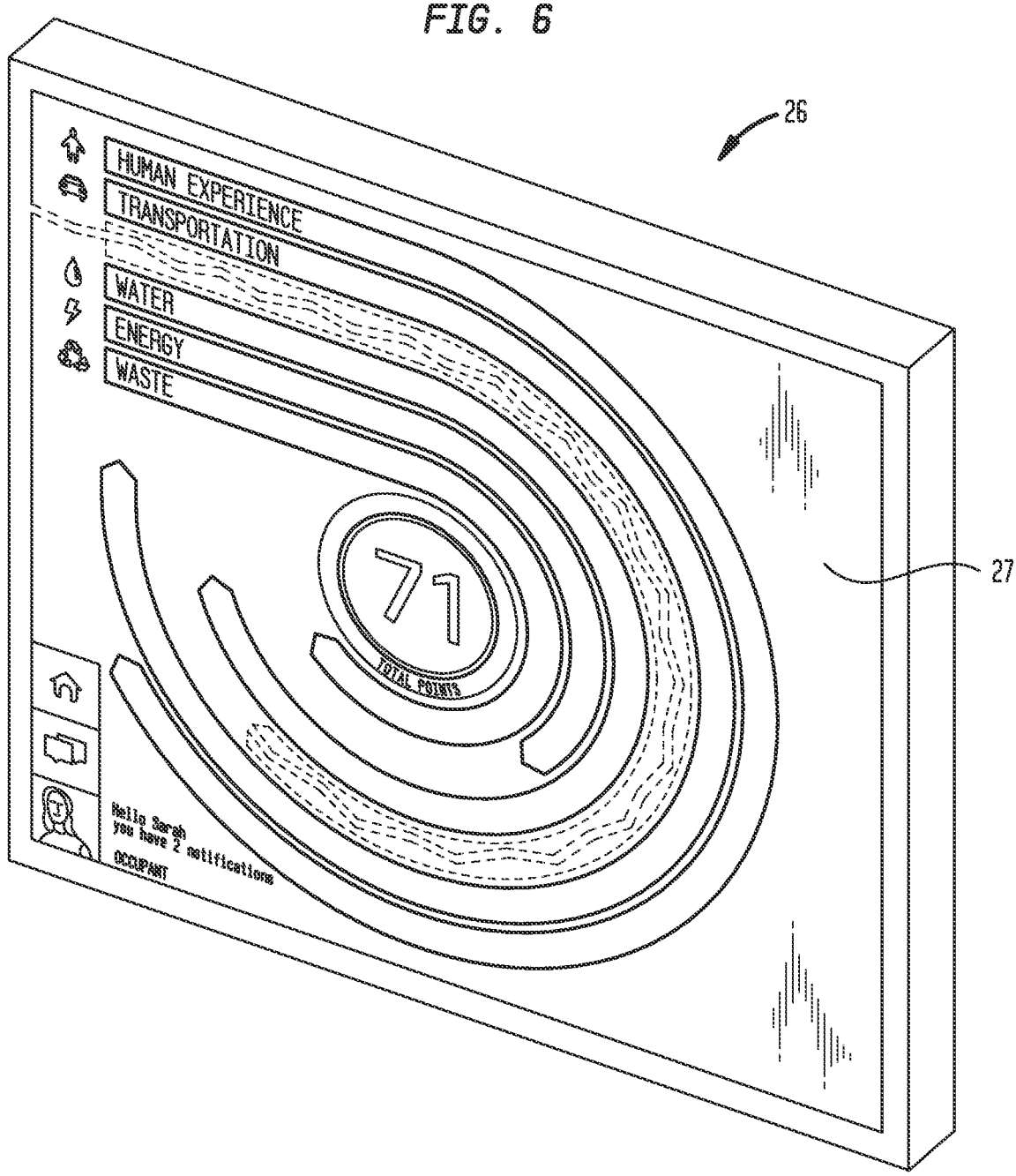
FIG. 6 shows one embodiment of a dashboard device 26 that is a "LEED Dynamic Plaque;"
Figure 7:
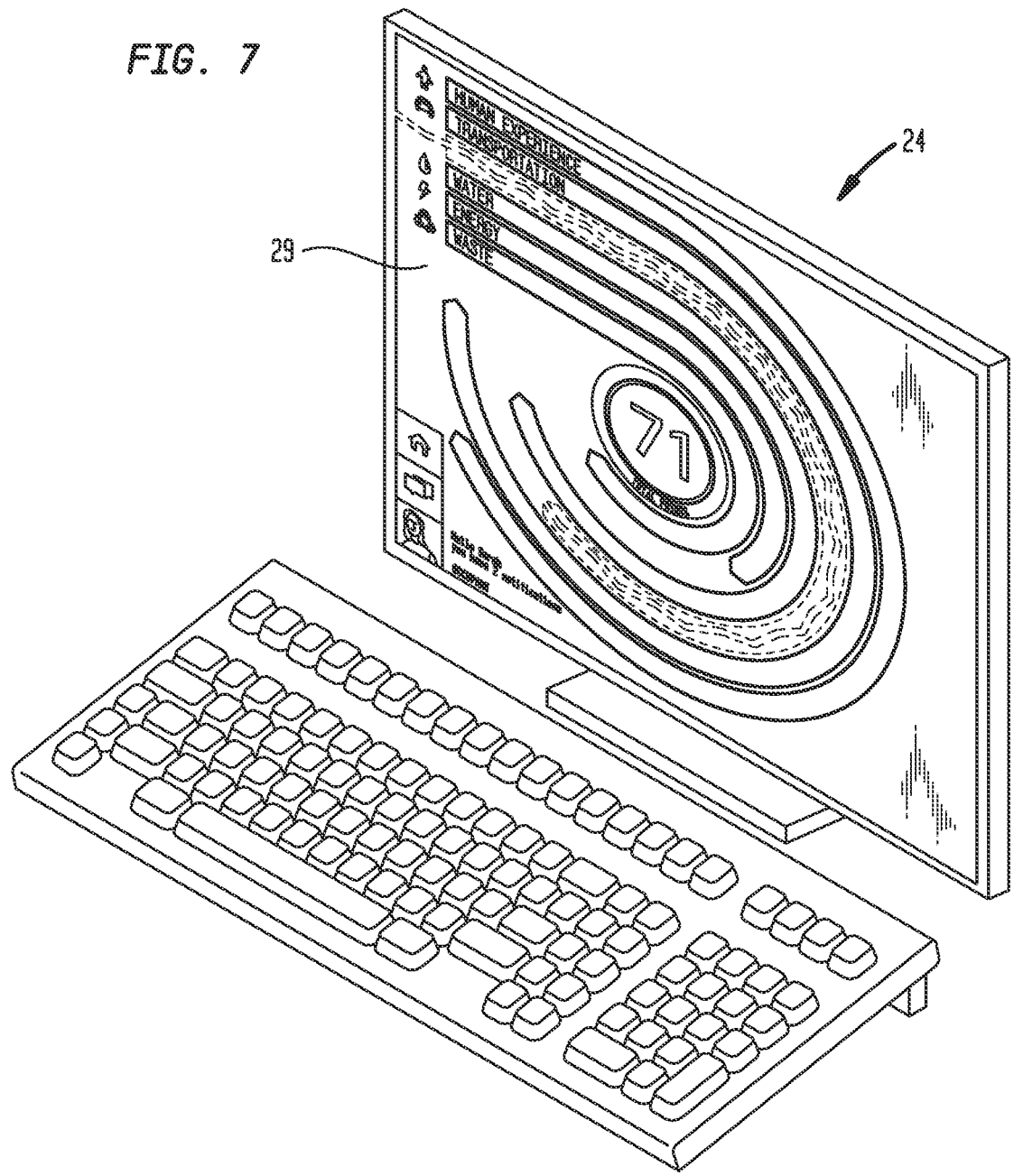
FIGS. 7 through 10 illustrate several different embodiments of dashboard devices 24.
Figure 8:
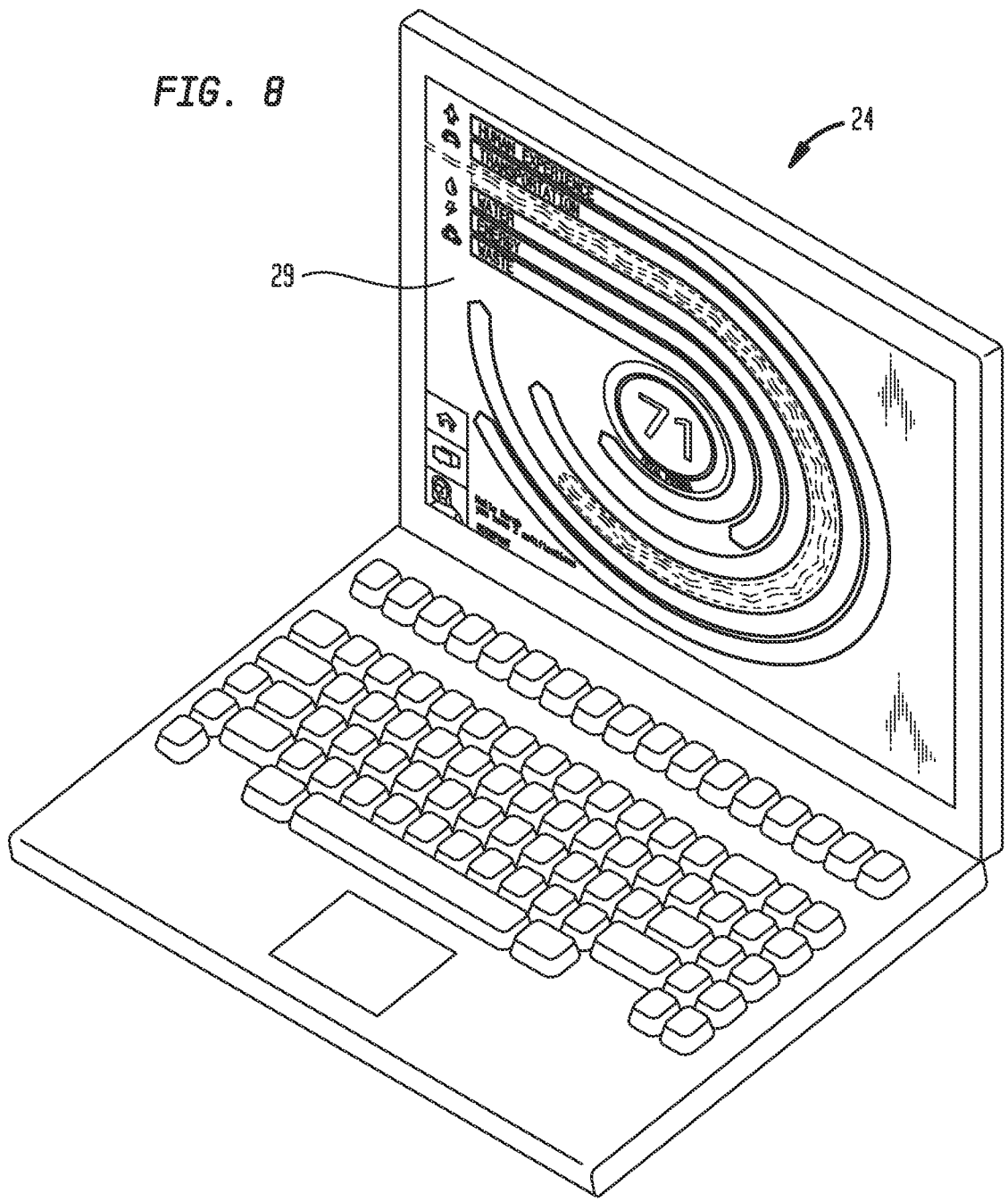

As shown in FIG. 6, in one embodiment, dashboard device 26 is a "LEED Dynamic Plaque™," which is configured to display information provided by data acquisition device 22 (e.g., a LEED box). Plaque 26 can be configured to display a LEED score and the latest level of certification corresponding to the building or structure. Plaque 26 can also be configured to display benchmark data regarding other buildings of a similar type, in a similar location, or in different (e.g., global) locations. According to one embodiment, the display of plaque 26 can be configured to activate or illuminate when people walk thereby or come into proximity thereto. Plaque 26 can also be configured to change its display dynamically as a function of time. The display of plaque 26 may also be reviewed and updated via the internet or web via server 50.

According to one embodiment, dashboard device 24 is a LEED Dashboard™ configured to provide a landing place for users and/or managers to provide input data to the system, to receive visual or other feedback therefrom. As described above, dashboard devices 24 and 26 may be any one or more of a variety of devices, such as a computer and associated computer display, a desktop computer and an associated display, a mobile phone, a touchpad, or any other such suitable device. In one embodiment, a dashboard device 24 is a place where interaction with plaque 26 and/or data acquisition device 22 can occur, and has three main landing screens depending on the user (e.g., general public 37, owners and managers 30, and occupants 28).

Figure 9:
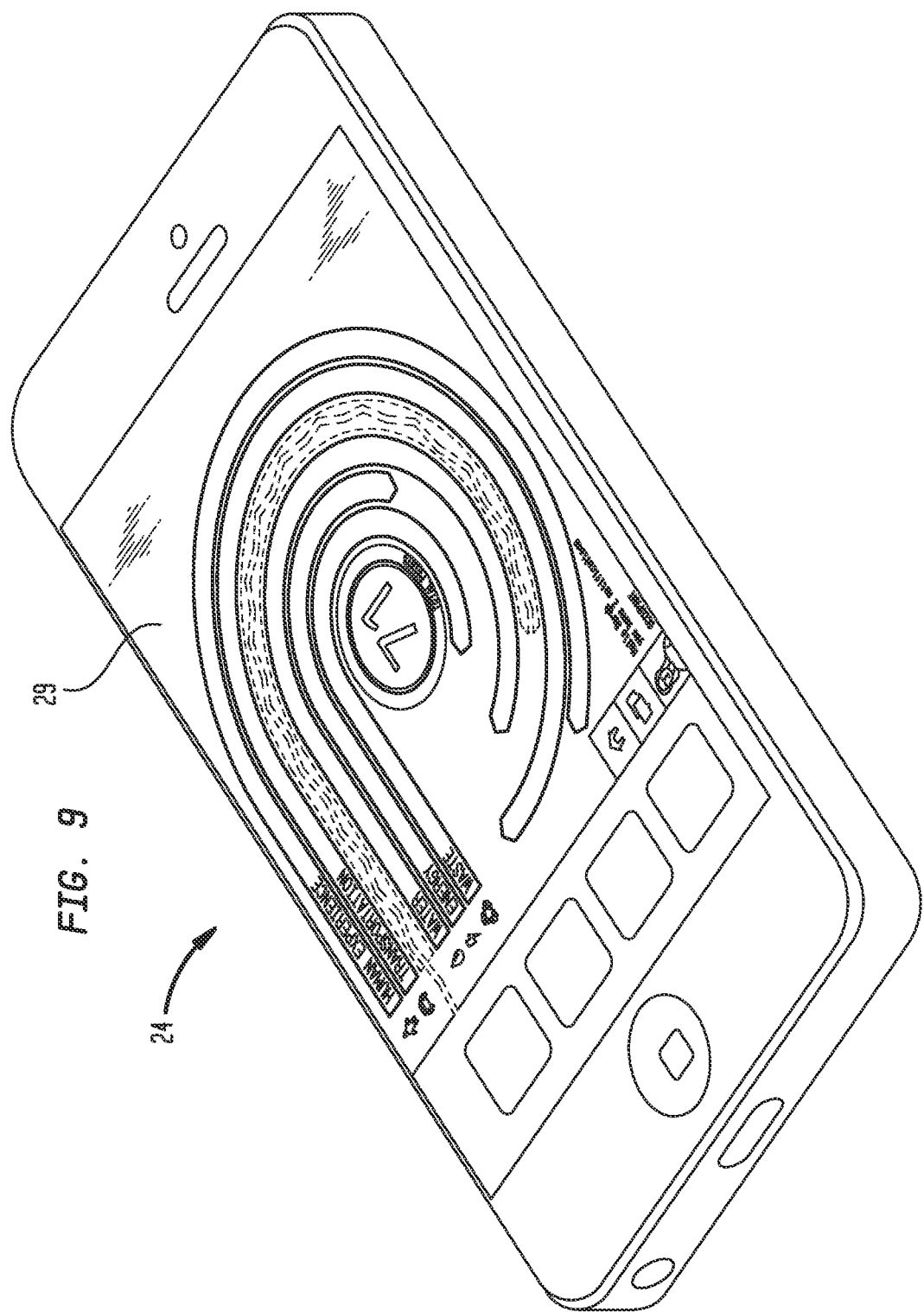
Figure 10:
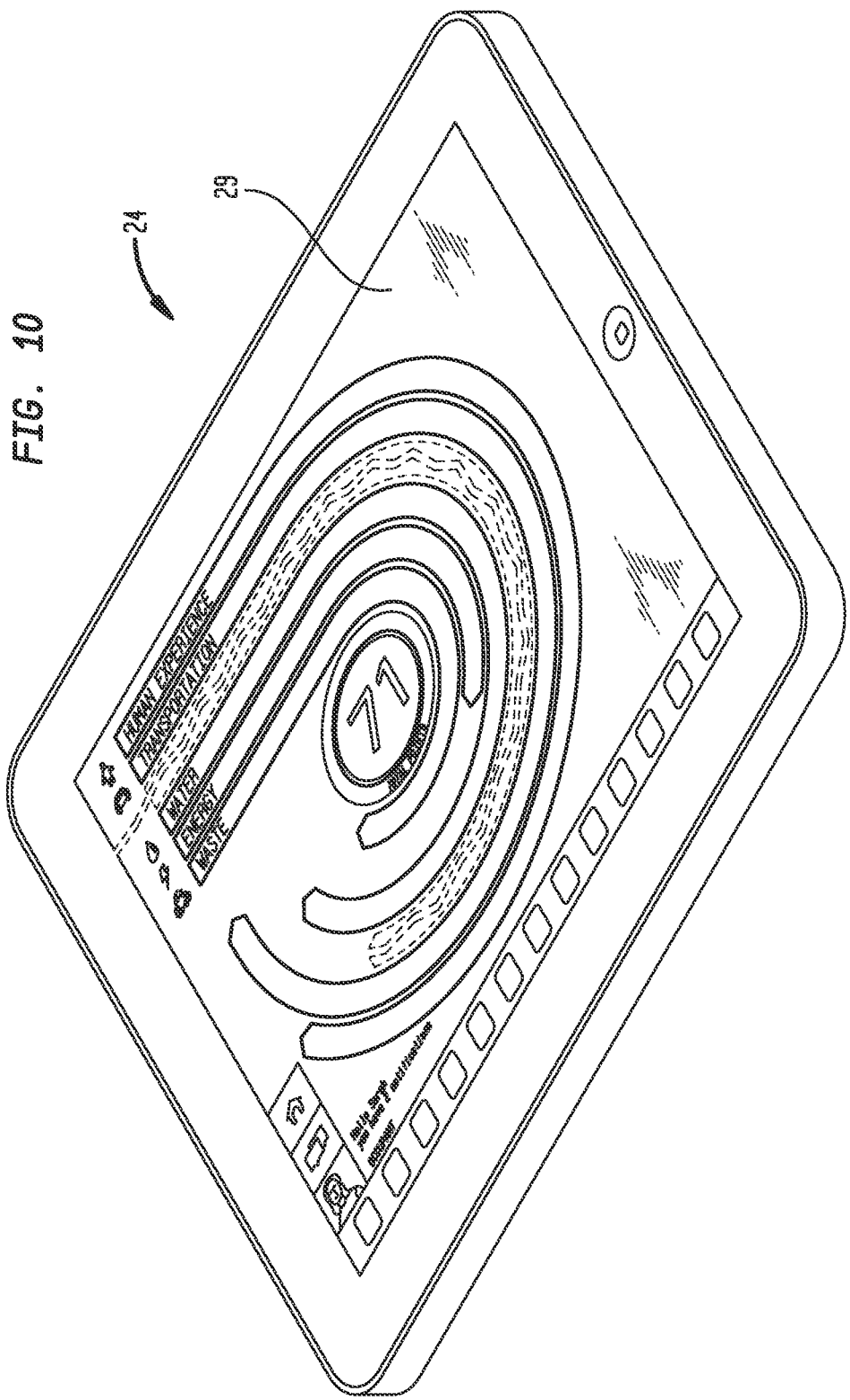

Referring now to FIGS. 6 through 10, there are shown various embodiments of a LEED dynamic plaque 26 (FIG. 6), and dashboard devices 24, such as a desktop computer 24 (FIG. 7), a laptop computer 24 (FIG. 8), a mobile phone 24 (FIG. 9), and a touchscreen or tablet 24 (FIG. 10). Other embodiments of dashboard devices 24 are contemplated, such as PDAs. Dashboard devices can be configured to execute applications and programs that provide information to server 50, and back to the user through data acquisition device 22 and/or plaque 26 or dashboard device 22.

Referring now specifically to FIG. 9, there is shown one embodiment of a LEED Dynamic Plaque located in a building lobby or the entry to a project, which is configured to provide a visual representation of the LEED or other score, and the at least types of performance data associated with the building or structure.

A LEED or other device dashboard 24 or 26 can also be configured to permit users, occupants or managers to dig deeper into the performance data. Such dashboard devices can be configured with applications that permit users to input analog data required for recertification. If a building management system exists and as circumstances in the building or structure change, dashboard device 24 or 26 can be a location where information flows between system 20 and its occupants or users regarding building and occupant or user performance.

Figure 11:
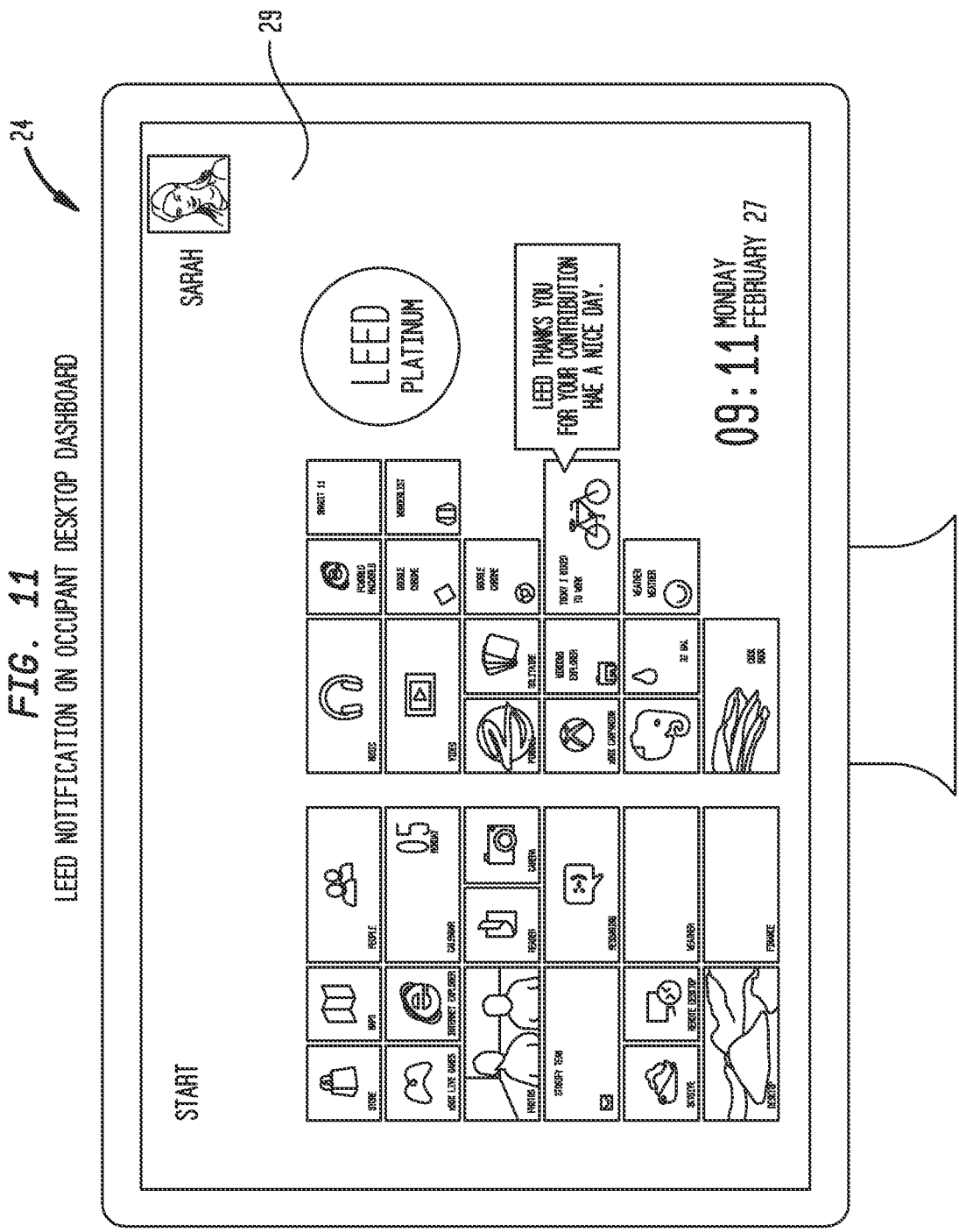

FIG. 11 shows one embodiment of a dashboard device display, which permits a user, occupant or manager to manage applications, respond to inquiries, or receive notifications. Such a dashboard landing page can be integrated in system 20 so everyone or selected persons in the building can establish a user account and access LEED or other related information.

Figure 12:
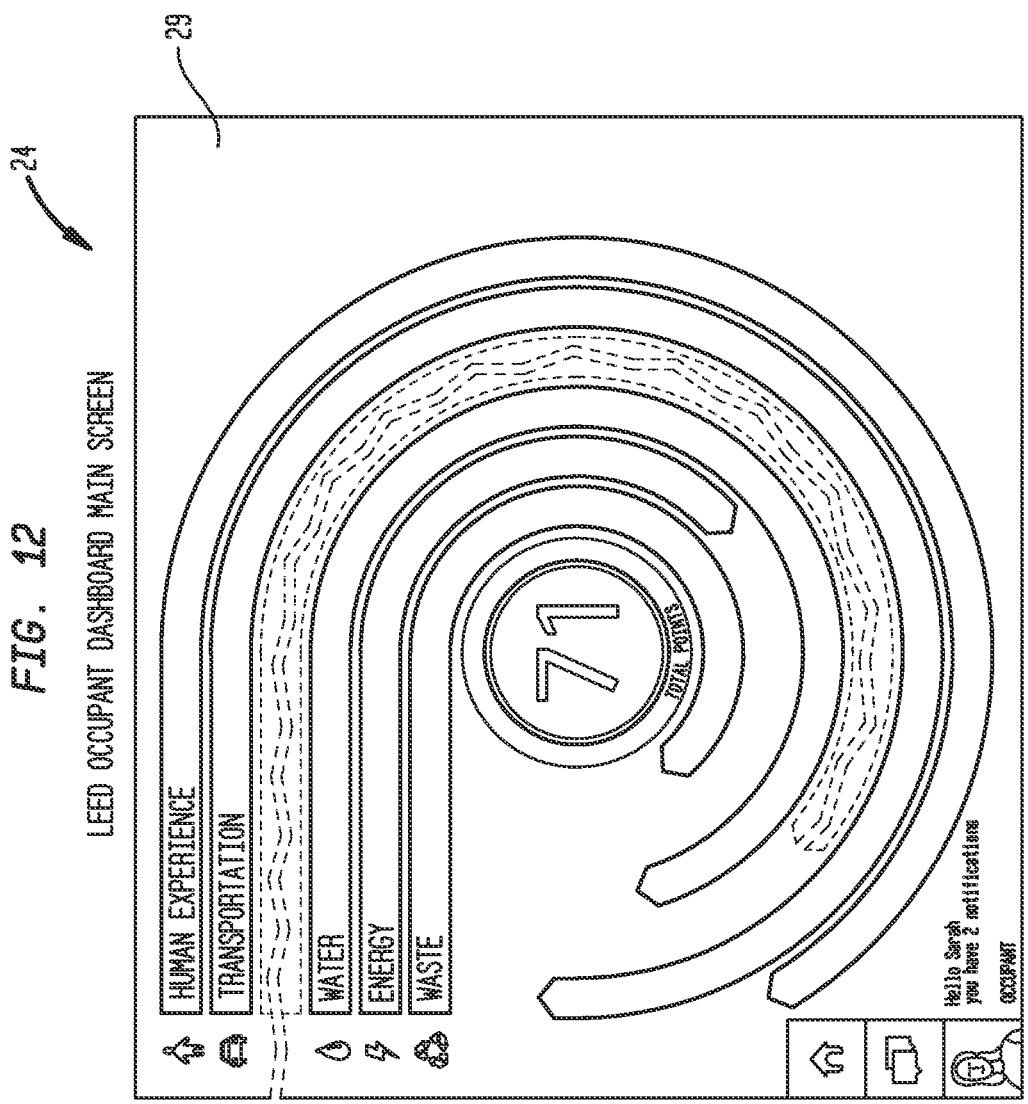

In FIG. 12, a user can view a representation of the LEED dynamic plaque associated with their project or building. The user can view notifications showing which actions might be taken that day, month or quarter in order to achieve LEED or other points and a possible higher LEED or other rating.

Figure 13:
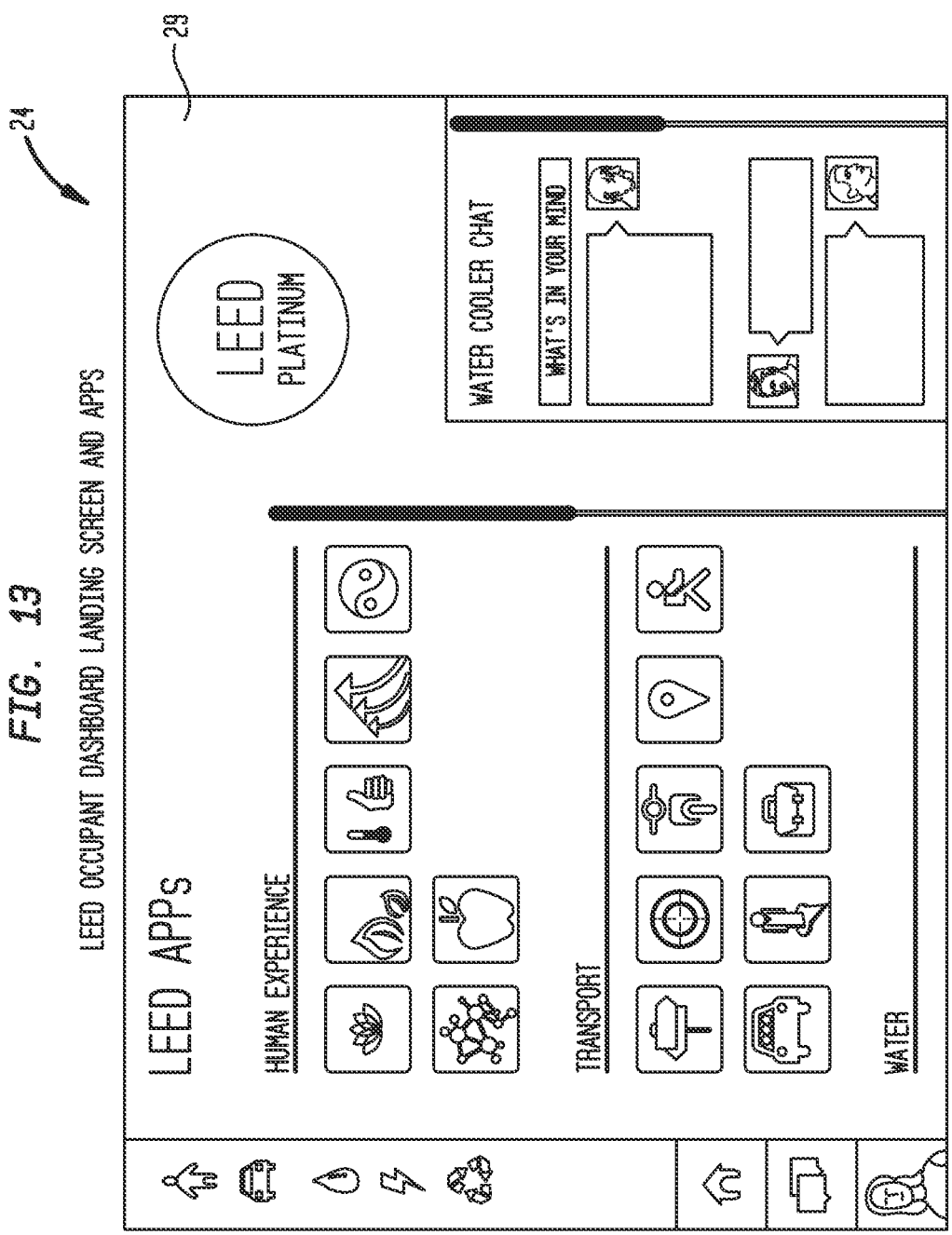

In FIG. 13, LEED or other applications are organized according to LEED dynamic plaque or other categories. A chat function may also be established or enabled via the server with a central or other sites. A current level of building certification can also be displayed on the application page.

Figure 14:
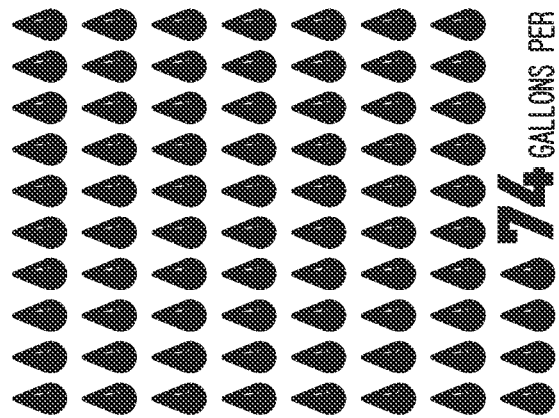

As shown in FIG. 14, users can see how the project or building is performing in each performance category. In each performance category, goals can be set the building and its occupants must meet for their target LEED or other certification, or to maintain their existing level of certification.

Figure 15:
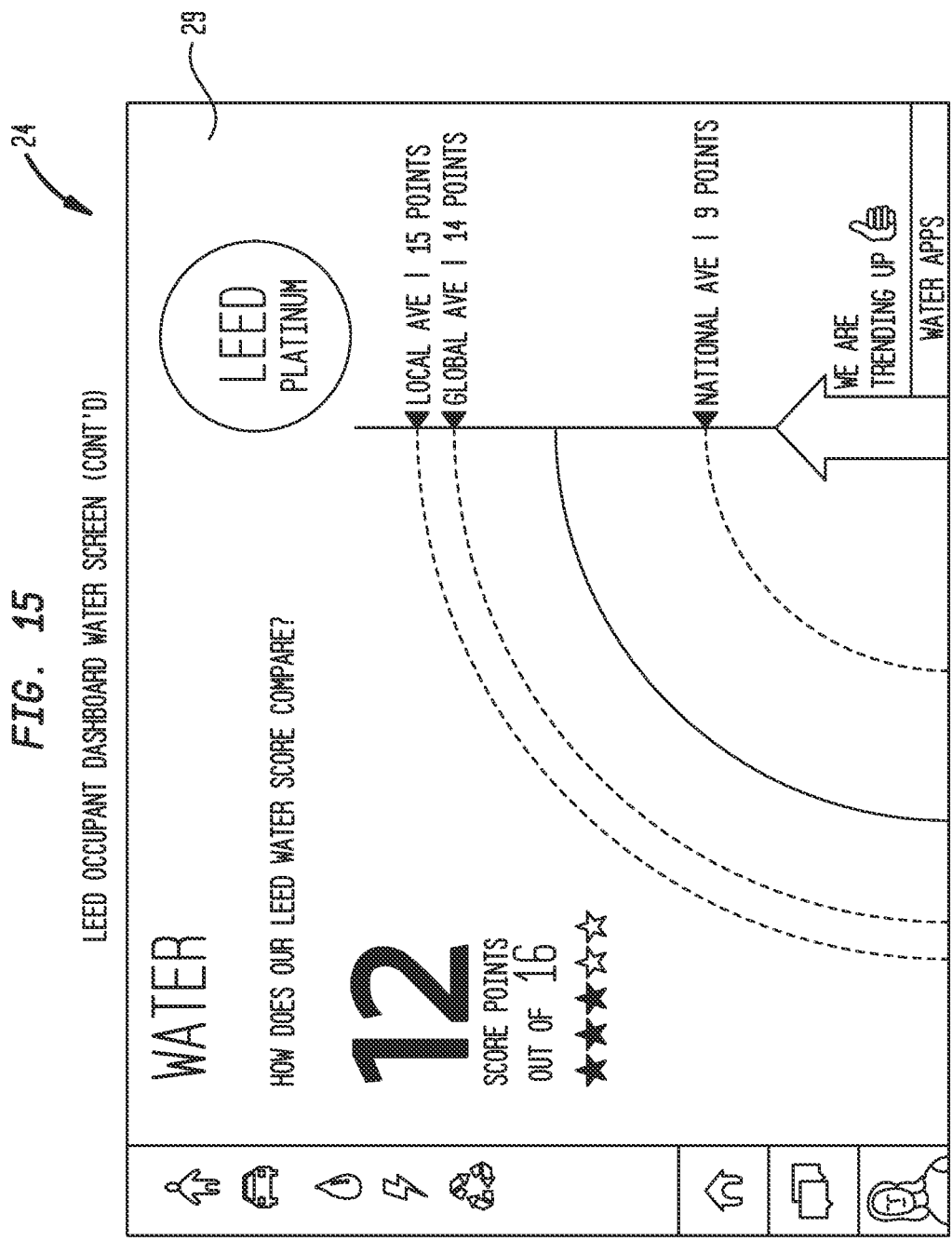

In FIG. 15, users can see how their project or building compares to other projects in the area or around the world in each category. They may also see whether they are trending up or down in each performance category.

Figure 16:
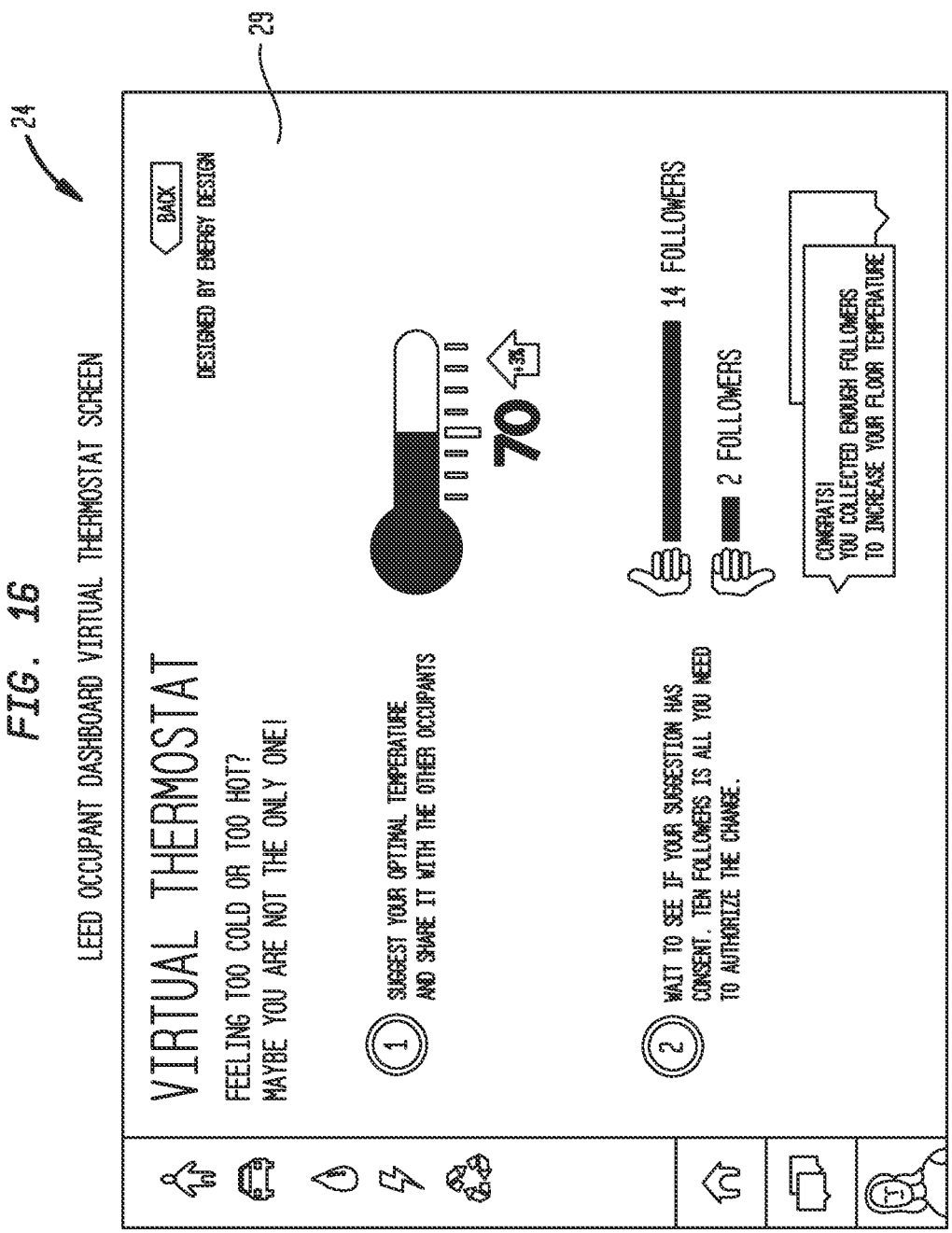

In FIG. 16, a sample application is shown that allows people to control their temperature if their building is equipped with VAV boxes. This particular application would permit users to find people in the space or nearby room who want to change the ambient temperature.

In FIG. 17, a building manager can use a dashboard device to input data and see how the project or building is performing in each category.

In FIG. 18, a building manager can see additional information which might affect a LEED or other score. According to one embodiment, the building manager can see occupancy, lighting use, plug load use and server use. This allows the building manager to determine if applications are working and/or if there are any anomalies requiring attention.

In FIG. 19, the manager has access to a manager dashboard page that permits the collection of information from building occupants regarding building malfunctions or related issues such as repairs. The building manager can also communicate with occupants regarding scheduled maintenance and other issues.

In FIG. 20, and according to one embodiment, inputs to system 20 can come a variety of sources and direction. Complex and large structures with budding management systems are connected to device 22 and dashboard 24. Smaller and less sophisticated structures or buildings may be able to manual inputs to system 20.

The calculation of LEED or other certification or recertification program points (which can be used, by way of example, to determine a LEED certification level) may be based on a method that assigns a score for the structural and design aspects of a building that is then augmented by further scores corresponding to the performance of the building over time. A design and construction component may be calculated based on design decisions and strategies implemented using dynamic programming algorithms and weighted decision trees. The algorithm factors in extra points or concessions due to certain combinations of strategies. A reference table with points for different options and combinations can be maintained for use by the algorithm. A performance component may be calculated based on the consistency of the building performance across multiple factors by using descriptive statistical methods. For example, by calculating the standard deviation and mean values of time-series data captured using data acquisition device 22 and/or dashboard device 24 and/or 26, an algorithm can determine the consistency of the measured performance data. The algorithm then determines a correlating factor, if any, for the building, which it includes in its performance analysis to determine a number of points or a score for performance. Each performance factor may have its own calculating algorithm. For example, the energy score may be calculated using a combination of energy used, building type, location and occupancy level. Such normalizing elements can permit benchmarks to be calculated in a standardized manner across all building types.

Thus, and in one embodiment, the total score or points earned by a building may be calculated by:

Total Points=Strategic Design Score+Performance Factor 1 Score+ . . . +Performance Factor $n$ Score+Correlating Factor Score By way of example, a LEED certification level can be determined by the number of total points achieved by a building. These points can be maintained as a reference table, and may be different for each type of certification and rating system used. As an example, the LEED 2009 definition uses the following reference table for existing buildings:
  Certified: 40-49 points
  Silver: 50-59 points
  Gold: 60-79 points
  Platinum: 80 points and above Example Score Calculation As an example, we assume the evaluation of a building located in downtown Washington D.C., and show how the algorithm would calculate points for the building and determine its certification level.

For construction and design of the building, which includes credits for strategies used in storm water management and treatment, establishment of biodiversity, urban heat island effect, light pollution reduction, results in 8 points.

Because this budding has monitoring systems in place, a LEED box captures and analyzes data. The LEED box identifies trends of energy use, and gives credit for energy reduction changes occurring over time as occupancy of building changes. Energy performance is determined to yield 18 points.

Similarly, monitoring of water use and water reduction mechanisms results in another 15 points towards the building's score.

The building manager collects information from weekly waste audits and uploads data to the LEED box showing the total amount of waste attributed to the occupants in the building. This accounts for 4 points.

The building manager runs a periodic survey to capture inputs from all building occupants and gauge level of comfort in the building, ease of access, functioning of energy reduction mechanisms and overall impact of the building on the occupant's experience. These performance results earn a total of 22 points.

A mobile app also captures data on transport methods used by the occupants to reach the building—by metro, bus, bicycle, car or walking. Such data can be uploaded to device 22 periodically for analysis and the results provide for another 17 points for the building and its occupants.

Thus, Total Points=8+18+15+4+22+17=84 points

Per the reference table set forth above, the building achieves 80+ points and is awarded a platinum level LEED certification.

Benchmarking algorithms may employ relevant budding information anonymously without referencing details that might identify the building's location or owners. Benchmark data helps building owners understand how their building is performing compared to other similar buildings, and identify areas for improvement.

The LEED Dynamic Plaque (LDP), the Dashboard and the Central Web Server (CWS)

We turn now to the operation and functionality of the LDP, the Dashboard and the CWS, which in one embodiment are configured to operate together so that performance scores of a particular building or structure can be displayed to a user, with a primary emphasis on the LDP and the CWS. In one embodiment, the CWS is a remote server, but may also be an on-site or local server. One embodiment of a system comprising LDP 26 and CWS 50 is shown in FIG. 3 (see server 50 and Dynamic Plaque or LDP 26 in FIG. 3).

FIG. 21 shows a Platform Stack Diagram illustrating several components in system 20, which is configured to process and display various types of information relating to one or more performance scores of a plurality of buildings or structures 1 that may be situated in thousands of different disparate geographic locations around the world. While only one building 1 is shown in FIG. 21, system 20 may be configured to operate in conjunction with dozens, hundreds or thousands of LDPs and dashboards located in hundreds or thousands of corresponding particular buildings or structures 1. As described above, information and/or data relating to human experience, transportation, waste, water, energy, or other types of information or data, pertaining to the performance of particular building or structure 1 (e.g., sensors 38, surveys 36, analog inputs 34, building automation systems 44, mobile apps 46, control systems 42, LEED box 22) may be provided in system 20 as sources of information and data regarding the building or structure to which they pertain. Future data or information sources 121 may be added to system 20 as the need or desire arises.

In one embodiment, application programming interface (API) host 123 resides in the LDP, dashboard 24, or LEED box 22, where the API host is configured to respond with building performance scoring information derived from or associated with building or structure 1. As further shown in FIG. 21, CWS 50 comprises scoring algorithm back end 127, which in one embodiment is configured to access a computer database containing information relating to individual LEED buildings or structures 1. The scoring algorithm is configured to execute a scoring algorithm to calculate a building performance score for a given building or structure 1. As described above, CWS 50 is configured to receive information and/or data associated with a particular to building or structure 1, which is then used to calculate performance scores for that building or structure 1. As described above, however, according to one embodiment system 20 is configured to operate in conjunction with dozens, hundreds and/or thousands of buildings or structures 1, each of which has a building performance score associated therewith, or for which a building performance score can be calculated by the scoring algorithm.

Still referring to FIG. 21, in one embodiment, LDP 26 comprises plaque user interface 25 (e.g., a display 27) and front end 125, while dashboard 24 comprises dashboard user interface 23 (e.g., a display 29, a keyboard, a mouse, etc.) and front end 125. Thus, system 20 comprises at least two building or structure user-directed components, namely LDP 26 and dashboard 24, which are operably connected to various backend components such as CWS 50, request handlers, database components and the budding performance scoring engine or algorithm. Note that further budding user-directed components, devices and systems may also be employed in system 20, such as by way of non-limiting example devices that permit information or data associated with building or structure 1 to be entered into system 20 by a user.

According to one embodiment, LDP 26 of FIG. 21 is a dedicated computer that is configured to display information associated with building or structure performance scores, primarily in public spaces such as building lobbies, hallways, or other areas. LDP 26 may comprise, for example, a Mac Mini computer, an intel-based NUC Mini computer (more about which is said below), an Apple iPad, or any other suitable computer or CPU-, processor-, microprocessor-, controller- or ASIC-based device that includes a suitable user display 27. LDP 26 is preferably configured to operate with an operating system such as Mac OSX, Windows XP/Vista/7/8/etc., or Linux, and is pre-programmed to load only required modules, and further preferably configured to disable any programs that might require user input or automated restarts (e.g. software updates, error messages, and so on). In one embodiment, the operating system of LDP 26 is configured to launch a web browser (e.g., Google Chrome) in Kiosk mode after LDP 26 has been powered up and all the required software modules have been loaded into the processor and memory thereof. By way of example, LDP 26 is thus programmed to execute the opening of a specific URL that provides access to building performance scores corresponding to the building with which LDP 26 is associated.

In one embodiment, dashboard 24 of FIG. 21 has loaded into a processor and memory or storage device thereof a cloud-hosted software application that is configured to support dashboard 24 by providing users and budding administrators with an interface with which to enter budding performance data, administer surveys for data collection, and enter or have entered therein other data or information.

Continuing to refer to FIG. 21 and the other Figures, CWS 50 may comprise one server, or more likely comprises a plurality of operably interconnected servers. These servers may be located and/or distributed in one and/or multiple geographical locations, and are preferably configured to operate in conjunction with one another, as well as in conjunction with a plurality of LDPs 26 and dashboards 24 located in different geographic locations, where individual LDPs 26 and dashboards 24 at such locations are associated with particular buildings or structures 1.

One or more servers associated with CWS 50 are configured to provide building performance scores and optionally other information (e.g., software or firmware updates for LDP 26 and/or dashboard 24, timing signals, etc.) to LDP 26 and dashboard 24. In one embodiment, such servers are included in, or operate in conjunction with, by way of non-limiting example, a web service such as the AMAZON WEB SERVICE (AWS), which includes the AMAZON ELASTIC COMPUTE CLOUD (Amazon EC2) web service. Amazon EC2 provides resizable computing capacity in the cloud, and makes web-scale computing easier to manage and control. Such a web service reduces the time required to obtain and boot new server instances to minutes, allowing capacity to be quickly scaled, both up and down, as computing requirements change. Such a web service also permits paying pay only for capacity that is actually used, and provides developers with tools to build failure resilient applications and isolate themselves from common failure scenarios. Building performance scores and other information provided to LDP 26 and dashboard 24 by CWS 50 may thus be hosted, again by way of example, as EC2 instances. These instances are kept behind an Elastic Load Balancer (ELP) that distributes requests to multiple web servers configured to serve LDP 26 and dashboard.

In one embodiment, request handlers are configured as Python scripts that are invoked depending on the type of request received by CWS 50. In such an embodiment, routing logic may be provided via a django framework that determines which handler will respond to a certain request. For instance, different handlers may be employed to retrieve building performance scores, adding meters, adding meter data, updating building information, and so on.

In one embodiment, a backend database incorporated into CWS 50 or operably connected thereto is PostgreSQL, which is configured in a master-slave model with two separate virtual machines located on Amazon AWS providing each instance. All read/write operations are invoked on the master database, but the slave is kept in sync with the master via postgres in-built mechanisms.

The scoring engine forming a portion of CWS 50 is the heart of the application that retrieves and evaluates all available data for a specific building or structure 1, and converts such data into a performance score that can be displayed on LDP 24 and/or dashboard 24 by leveraging multi-factor monolithic splines and a reference set model to create a convex hull analysis corresponding to a particular budding or structure's performance score.

In one embodiment, when a request originates from LDP 24 and/or dashboard 24, the request goes to the Amazon ELB, which in turn passes the request along to one or more of the available web servers of CWS 50. The selected web server(s) runs Apache/2.2.2, with mod_wsgi and python/django. The request is processed by Apache to verify authorization of the client to make the request, then via mod_wsgi is passed on to the request handlers that are incorporated into the django framework.

In some embodiments, request handlers can be configured using a variety of open source libraries, including, but not limited to, one or more of django v1.4.5, argparse 1.2.1, configobj 4.7.2, django-debug-toolbar 0.9.4, django-digest 1.13, django-live-profiler 0.0.9, django-piston, httplib2 0.7.2, isolate 0.4.9, keyring 0.9.2, numpy 1.7.1, psycopg2 2.4.5, pyOenSSL 0.12, pycrypto 2.4.1, requests 1.2.0, requests-cache 0.4.0, suds 0.4, vertualenv 1.10.1, fabric 1.8.0, south 0.8.2, python-dateutil 2.1, django-celery 3.1.1, celery>=3.1.7, redis 2.8.0, and django-smtp-ssl 1.0. Source code written to handle requests utilizes the above described or other suitable software to retrieve data hosted in a PostgreSQL database and packaged for return back to the requester.

In some embodiments, the requesting user's credentials are authenticated and authorized against an in-house application of record called LEED Online. Depending on the status of the user's authorization data stored on CWS 50, the user will see only the data he or she is authorized to access and display. A backend script may be triggered when new data is entered in dashboard 24 relating to energy, water, waste, transportation, human experience or other factors, or basic building information. In one embodiment, this script has a 5-minute delay built into it to account for multiple data entry units. The script invokes the scoring engine, which retrieves all known data for a building or structure 1, and which is based on a pre-defined algorithm and set reference factors, calculates a LEED building performance score for the budding or structure 1. In the event new date corresponding to a given building or structure 1 is not entered during a predetermined period of time (e.g., one day, one week, or one month), a trigger is built into CWS 50 to ensure building data, information and scores are kept up to date. This backend script may use, for example, django-celery or cron depending on the situation at hand.

Once the scoring calculation for a given building or structure 1 has been completed, any required notifications or alerts are sent to LDP 26 and/or dashboard 24 if the calculated score falls outside a given range or threshold. Once the score has been updated, a subsequent request from LDP 26 and/or dashboard 24 will result in the transmission thereto of an updated building performance scores for building or structure 1.

The following computer pseudo-code illustrates one illustrative embodiment of software configured to be loaded in and executed by LDP 26, and that is further configured to operate in conjunction with CWS 50. In particular, the pseudo-code shown below can be stored in a computer readable medium associated with LDP 26 for execution in processor 112 thereof (see FIG. 23), and used to execute the display of LEED building performance scores and/or other data and information on display 27. In such a manner, at least some of the functions of LDP 26 according to one embodiment are carried out.

1. LDP 26 is switched on or powered up, and automatically loads software loaded into a memory or storage device thereof that is associated with the LEED dynamic plaque and display. A request for retrieval of the building performance score and animation code from CWS 50 is generated by LDP 26, and sent to CWS 50.
2. The request is received by the CWS 50 apache).
3. Apache passes control to a plaque or LDP handler.
4. The plaque or LDP handler of CWS 50 retrieves the building's score data from the backend of CWS 50 using an API call.
5. A template in CWS 50 assembles the javascript code and associated CSS required to execute the plaque animation code and/or instructions specific to the score, and then sends such code back to LDP 26 for rendering and display.
6. A browser on LDP 26 receives the HTML/Javascript CSS data from CWS 50 and initiates rendering and execution of such code by LDP 26. The executed code generates and runs the LDP animation on display 29 of LDP 26.
7. The downloaded javascript also sets the run count to 0, and saves the score in a variable for offline use when it is loaded, and at the end of the animation checks to determine whether the count<=3.
    a. If count is less than 3, a new request is not generated and the plaque continues to use the data it has just received.
    b. If count reaches 3, the javascript code checks whether CWS 50 is reachable.
        i. If CWS 50 is reachable, LDP 26 will request updated scores.
        ii. If CWS 50 is not reachable, LOP 26 will continue to use the initial data set it has already received until a working connection is established with CWS 50 and the score can be updated.

The computer pseudo-code set forth below illustrates one illustrative embodiment of software configured to be loaded in and executed by dashboard 24, and that is further configured to operate in conjunction with CWS 50. In particular, the pseudo-code shown below can be stored in a computer readable medium associated with dashboard 34 for execution by a processor thereof, and used to execute the display of LEED building performance scores and/or other data and information on display 29 thereof. In such a manner, the operation of the following computer pseudo-code illustrates one embodiment of software configured to be loaded in and executed by LDP 26, and that is further configured to operate in conjunction with CWS 50. In particular, the pseudo-code shown below can be stored in a computer readable medium associated with LDP 26 for execution in processor 112 thereof (see FIG. 23), and used to execute the display of LEED building performance scores and/or other data and information on display 27. In such a manner, the operation of at least some of the functions of dashboard 24 according to one embodiment are carried out.

1. Dashboard user visits designated LEED website on CWS 50 and signs in.
2. User signs in with his or her LEED Online credentials.
3. If authenticated successfully,
    a. Retrieve list of projects the user is authorized to work on.
    b. From this list, filter out projects that are not enabled or participating in the LEED Performance program for that user and/or building or structure.
    c. Display the filtered list to the user for selection. If there is only one project available, automatically select the project and move to next step.
    d. For the selected project, load the dashboard.
    e. Dashboard load request is received by CWS 50 (apache).
    f. Apache passes control to dashboard handler.
    g. The dashboard handler creates a multi-page template with a navigation menu and display components that together comprise the LEED dashboard display.
        i. If the user is authorized to enter building or meter data, a data input section is made available to the user.

ii. If the user is not authorized to enter building or meter data, the data input section is not made available to the user.

h. For individual sections (e.g., certification history, overview, energy, water, waste, transportation, human experience, survey and data input) a request is passed to an appropriate handler upon selection by the user.

i. For certification history, overview, energy, water, waste, transportation, human experience, and other applicable sections, the template is predefined and only data which are authorized to be provided and filled in are retrieved from the backed of CWS 50 using an API call.

j. For survey data, a unique identifier key is generated for each client or user that restricts survey entry for a given user to one entry per day, or according to some other suitable schedule. When the survey is filled out and submitted by the user, a message is displayed to the user acknowledging the submission.

k. For data input, a tab-based template displays the various data input sections for updating basic building information and specific meters associated with energy, water, waste, human experience, and any other applicable sensors or data inputs. Each meter is set up based on the type of data that it collects, and can be configured to display a trend graph of data collected over a predetermined period of time (e.g., the previous 12 months) for each meter, 4. If the user is not authenticated, an error message is displayed on screen 29 of dashboard 24.

Figure 22A:
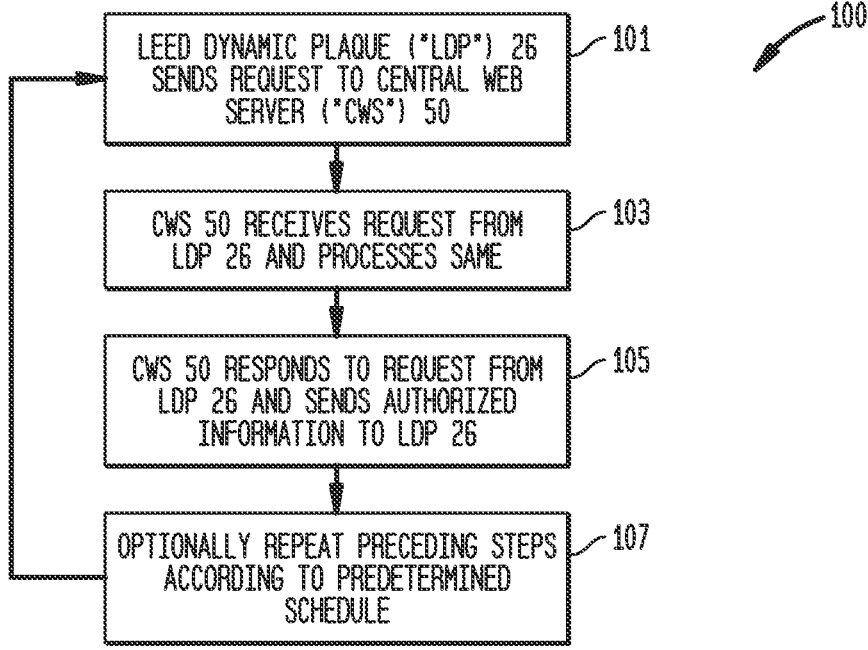
FIG. 22(a) shows one embodiment of a method 100 for displaying performance scores with an LDP 26.
Figure 22B:
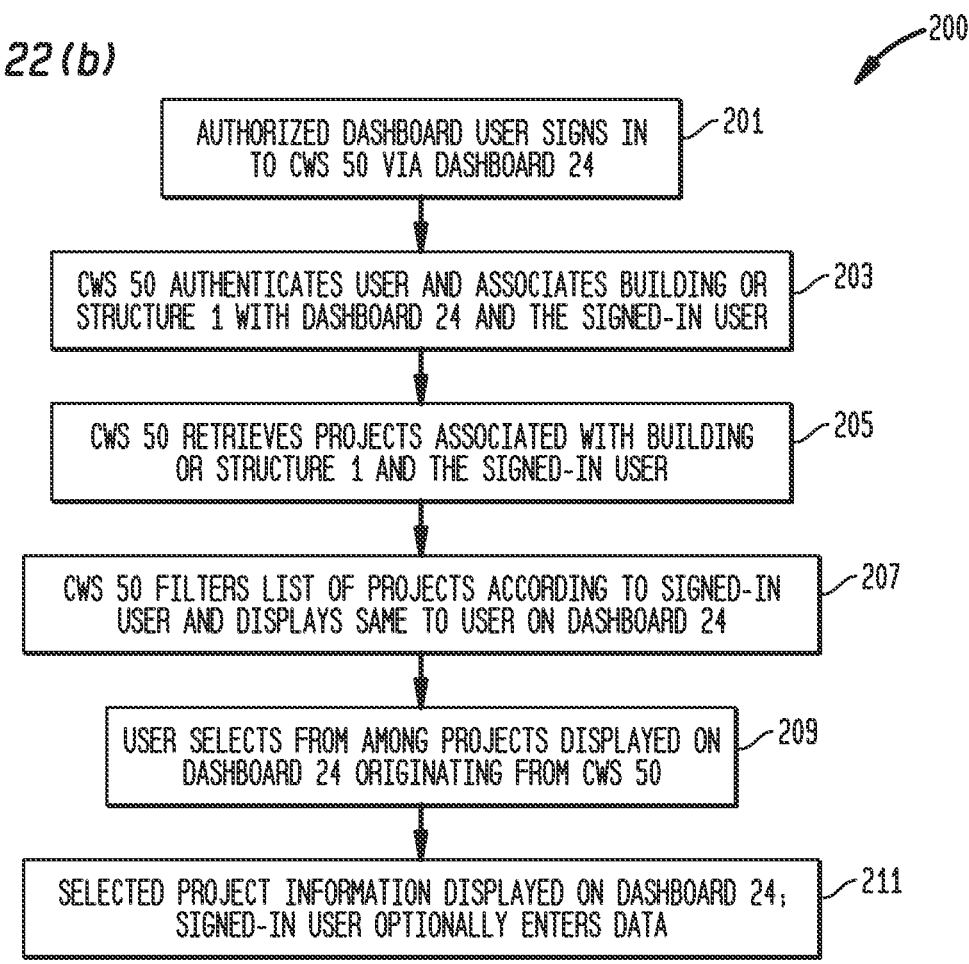
FIG. 22(b) shows one embodiment of a method 200 for communicating with and downloading information and/or data from CWS 50 using dashboard 24.

FIG. 22(*a*) shows one embodiment of a method 100 for displaying performance scores with an LDP 26 that are associated with a particular building or structure 1. At step 101, LDP 26 sends a request to CWS 50 for updated or new information concerning the performance scores associated with building or structure 1. In one embodiment, such requests are sent via the internet 48 between LDP 26 located near or in building or structure 1 and remotely located CWS 50. At step 103, CWS 50 receives the request from LDP 26 and processes the request to ensure that the request is valid and authorized, and to identify and determine the building or structure 1 to which the request pertains. At step 105, CWS 50 responds to the request from LDP 26 and sends authorized information to LDP 26 concerning the performance scores associated with the identified building or structure 1. These performance scores are calculated using a scoring algorithm and database residing in the CWS or elsewhere, more about which is said above. Upon receiving such performance scores through, for example, the internet 48, LDP 26 displays such scores on a screen or other user interface associated with or incorporated into LOP 26. At step 107, the process of requesting and providing performance scores is repeated, which in one embodiment is carried out according to a predetermined schedule (e.g., weekly, daily, hourly, every 10 minutes, etc.), or according to user inputs to LDP 26 and/or CWS 50.

FIG. 22(*b*) shows one embodiment of a method 200 for communicating with and downloading information and/or data from CWS 50 using dashboard 24, where the information or data are associated with a particular building or structure 1. At step 201, an authorized user signs in to CWS 50 from dashboard 24 via, for example, Internet 48. At step 203, CWS authenticates the user and associates building or structure 1 with dashboard 24 and/or the authorized signed-in user. (Unauthorized users are flagged by CWS 50 and not permitted to communicate with same.) At step 205, CWS 50 retrieves projects associated with the building or structure and/or the signed-in user. At step 207, CWS 50 filters the list of retrieved projects according to the identity and authorization level of the signed-in user who is accessing CWS 50 from dashboard 24. At step 209, the signed-in user selects from among the list of projects displayed on dashboard 24 that he or she is permitted to access, and that originate from CWS 50. At step 211, project(s) are selected by the signed-in user using the display and inputs operably connected to dashboard 24. The signed-in user may optionally enter further data for transmission to CWS 50 (if authorized by CWS to do so). Building performance score data and animation or other types of code (e.g., software updates) may also be downloaded to dashboard 24 from CWS 50 according to the authorization level of the signed-in user, and in a manner similar to that described above for LDP 26.

FIG. 23 shows one embodiment of representative hardware system 110 that according to one embodiment may be employed in LDP 26 (or in dashboard 24) to display the performance scores associated with building or structure 1, to send requests or receive information or data from CWS 50, and/or to receive information or data from sensors 38, surveys 36, and analog inputs 34. As shown in FIG. 23, and in one embodiment, LDP hardware system 110 includes a central processor 112, and a number of other hardware components that are configured to carry out the operation of LDP 26 (or dashboard 24) and its associated processor 112. Display 27 forming a portion of or operably connected to LOP 26 is configured to display performance scores and other information to a user through, for example, Back Panel Mini DisplayPort Connector 114, Those skilled in the art will understand that LDP hardware system 110 (and similar hardware for dashboard 24) may comprise any suitable computer or data processing system. In the embodiment shown in FIG. 23, however, LOP hardware system 100 is an INTEL NUC board D54250WYB or D340010VVYB, the Technical Product Specification of which is filed with the present patent application on even date herewith in an accompanying Information Disclosure Statement, and which is also incorporated by reference herein in its entirety.

Continuing to refer to FIG. 23, processor or CPU 112 in system 110 is configured to perform at least some of the various methods described above and in the Figures that are associated with LOP 26 (and dashboard 24). System 110 and/or LDP 26 (and dashboard 24) may further comprise a data source/storage device that includes a data storage device, computer memory, and/or a computer readable medium (e.g., memories 116 and 118 in FIG. 23). System 100 and/or LDP 26 (and dashboard 24) can be configured to store and/or execute, by way of example, programs or instructions that are configured to effect the display, transmittal, reception, and/or processing of performance score or other information or data associated with building or structure 1, including programs or instructions associated with one or more application programming interfaces (APIs) and web browsers such as GOOGLE CHROME, MICROSOFT EXPLORER or any other suitable web browser such as FIREFOX. Such programs, instructions, and other information or data may be stored in one or more memories, flash drives, hard drives, or memories located in LOP 26, in processor or CPU 112, in hardware system 110, or in any other suitable location accessible by LDP 26 (and/or dashboard 24). Processor 112 may be, by way of example, a programmable general purpose computer, a controller, a CPU, a microprocessor, a plurality of processors, or any other suitable processor(s) or digital signal processors (DSPs). Processor 112 is programmed with instructions corresponding to at least one of the various methods and devices described herein such that the methods, software and/or modules are executable by processor 112 and/or any other processors associated with system 20. Processor 112 and/or hardware system 110 may also include a graphics processor configured to execute the quick or high-resolution display of information shown on display 27 (or display 29, in the case of dashboard 24), as is well known in the art.

Referring now to the Figures and the above description, and according to some embodiments, software loaded in CWS 50, LDP 26, dashboard 24, and/or in other components of system 20 may be configured to operate in conjunction with various software packages, modules and programs such as HTML, HTML source code, Javascript, Java, Python, Apache HTTP server software (e.g., for the CWS), Cascading Style Sheets (CSS) such as CSS3, suitable operating systems such as MICROSOFT WINDOWS, LINUX-based operating systems, and other suitable operating systems known to those skilled in the art, web browsers (such as those listed above), and/or various open source or other suitable software programs and tools finding application in system 20. In one embodiment, LDP 26 and hardware system 110 are configured to have loaded therein, store and execute a suitable operating system and web browser. According to one embodiment, and upon being powered up, LDP 26 (or dashboard 24) automatically executes the web browser in kiosk mode, where the browser has been pre-configured to operate in a functional mode specific to the building or structure 1 with which LDP 26 (or dashboard 24) has been associated, and which enables appropriate communication back and forth between CWS 50 and LDP 26 (or dashboard 24). LDP 26 (or dashboard 24) is thereby permitted to display to a user on the display thereof information such as the various performance scores associated with the particular budding or structure 1.

In one embodiment, Apache HTTP server software loaded in one or more memories or other storage devices of CWS 50 processes requests from LDP 26 (or dashboard 24) made through the internet 48 or by other means, by employing, by way of non-limiting example, an Apache module that can host a Python application supporting the Python Web Server Gateway Interface (WSGI) interface. Requests from different LDPs arriving at CWS 50 can be identified, authorized, ranked, processed and responded to using such modules.

Referring now to FIG. 24, there is shown one embodiment of LDP 26 having displayed on display 27 thereof an overall performance score 82 associated with a specific building or structure, which is disposed at the center of a racetrack display 80. In addition to overall performance score 80 disposed at the center thereof, racetrack display 80 comprises individual building performance scores. In the embodiment shown in FIG. 24, individual performance scores in racetrack 80 are associated with human experience, transportation, waste, water and energy, respectively, are displayed in a "racetrack" format, where the length of each curved or circular segment associated with a given performance score is proportional to its respective performance score. That is, the longer the curve or segment associated with a given score, the higher the score is. As described above, each score is provided by CWS 50, which is in communication with LDP 26 (or dashboard 24), and which preferably, although not necessarily, provides updates on such scores to LDP 26 (or dashboard 24) according to a predetermined schedule, or upon a request being sent to CWS by LDP 26 (or dashboard 24) and/or an authorized user.

In the manner described above, CWS 50 is configured to transmit animation code and/or instructions to LDP 26 (or dashboard 24) that are executed by LDP 26 (or dashboard 24) to display the "racetrack" performance score information that is to be displayed on display 27 of LDP 26 (or display 29 of dashboard 24). In one embodiment, the animation code and/or instructions downloaded to LDP 26 (or dashboard 24) from CWS 50 are configured to permit the animated presentation of building performance scores in a sequential order, more about which is said below.

Figure 25A:
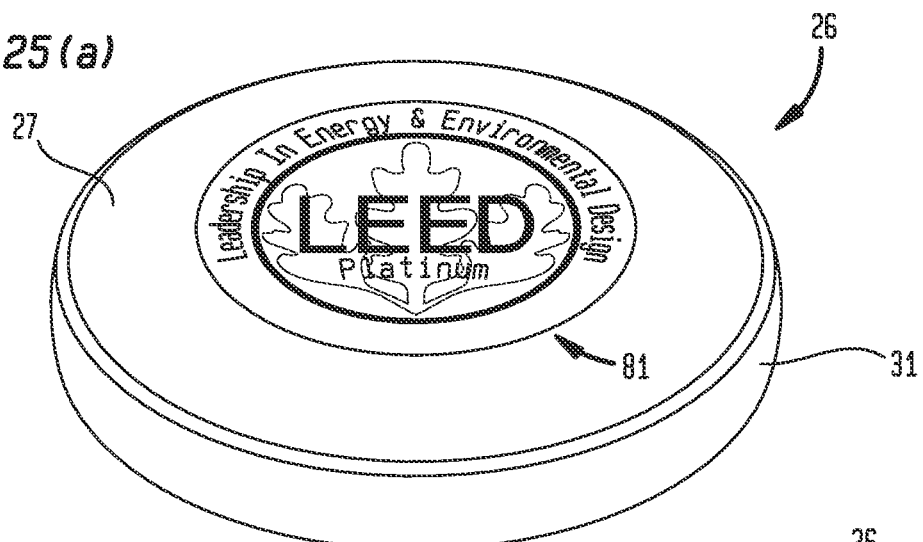
FIGS. 25(a), 25(b) and 25(c) show one embodiment of LDP 26 different views.
Figure 25B:
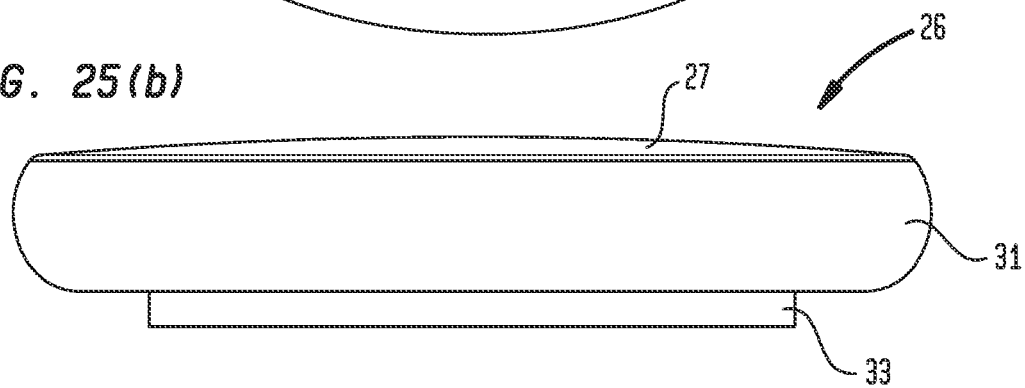
Figure 25C:
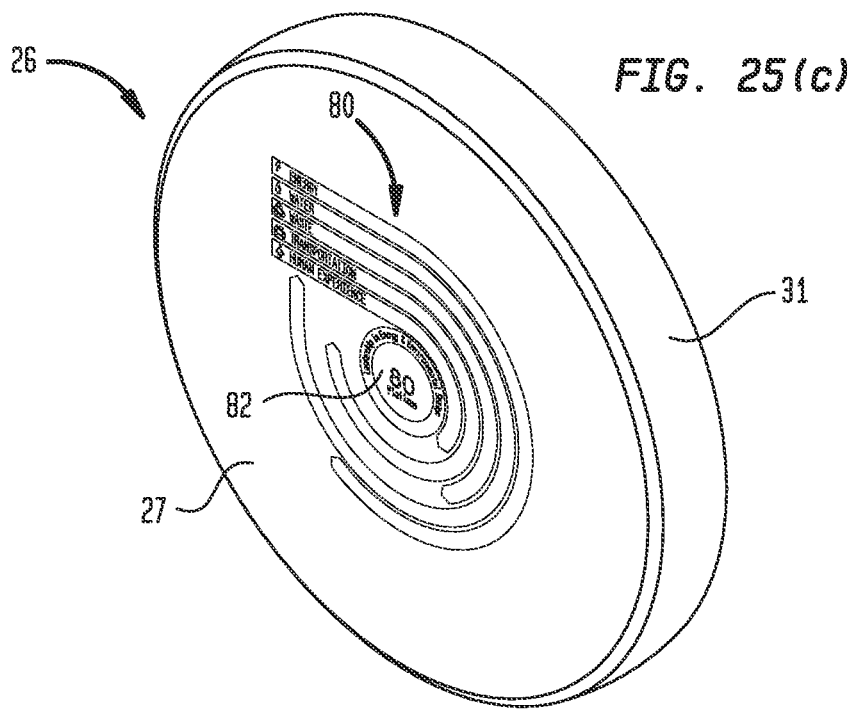

FIGS. 25(*a*), 25(*b*) and 25(*c*) show one embodiment of LDP 26 from top perspective, side and bottom perspective views. In FIG. 25(*a*), a LEED logo 81 is initially displayed on display 27 of LDP 26. Housing 31 contains hardware system 100 and display 27. Rear plaque mounting portion 33 of LDP 26 permits LDP 26 to be mounted on a wall or other suitable surface. FIG. 25(*b*) shows a side view of LDP 26 of FIG. 25(*a*), FIG. 25(*c*) shows a top right perspective view of LDP 26 of FIGS. 25(*a*) and 25(*b*).

Figure 26A:
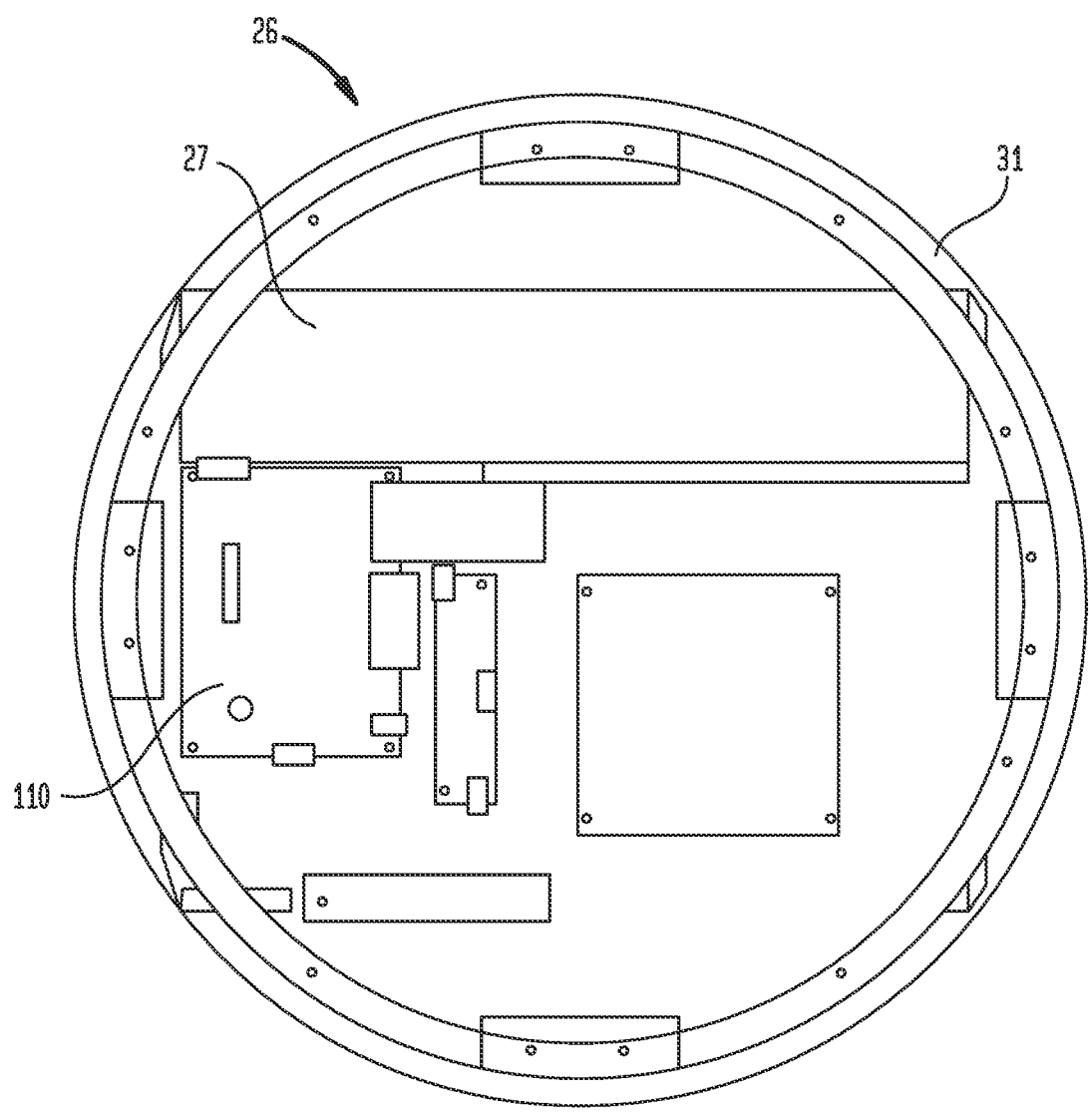
FIGS. 26(a) and 26(b) show partially disassembled rear and front views, respectively, of LDP 26 according to one embodiment.
Figure 26B:
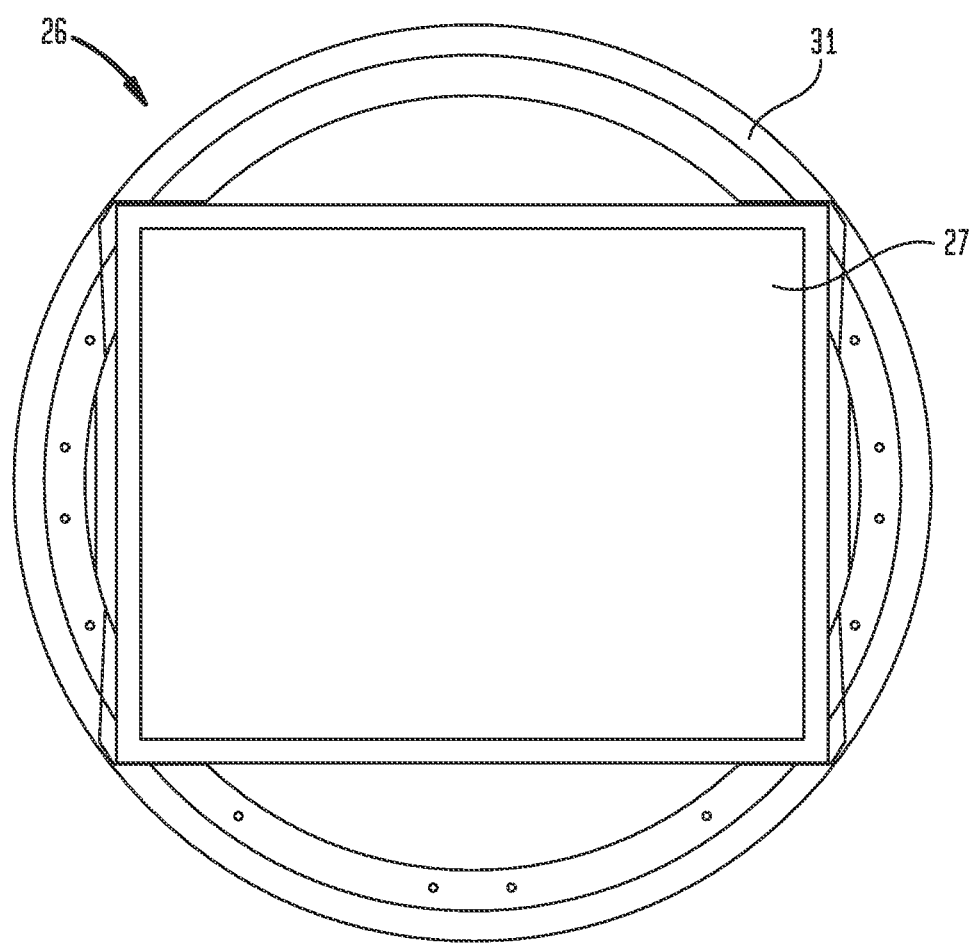

FIGS. 26(*a*) and 26(*b*) show partially disassembled rear and front views, respectively, of LDP 26 according to one embodiment. In FIG. 26(*a*), a rear cover has been removed from LDP 26, and hardware system 110 is shown mounted on a printed circuit board, and a top portion of display 27 I shown disposed therein. In FIG. 26(*b*), a front cover has been removed from LDP 26 and display 27 is shown mounted thereon. In one embodiment, a glass, acrylic, plastic or other suitable transparent or translucent cover (not shown in FIG. 26(*b*)) is mounted over display 27 to protect the display and enhance the clean or stylish appearance of LDP 26 as viewed by a user.

Figure 27A:
FIGS. 27(a) through 27(i) show sequential partial views of animated displays shown on the display LDP 26 according to one embodiment.
Figure 27B:
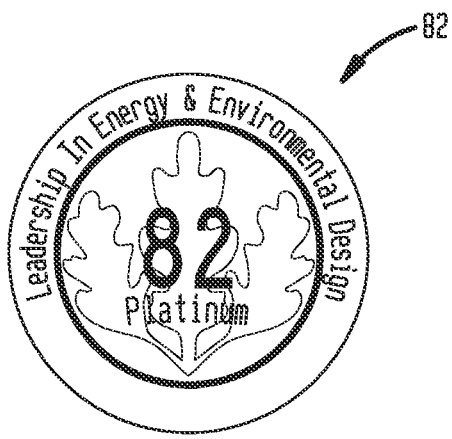
Figure 27C:
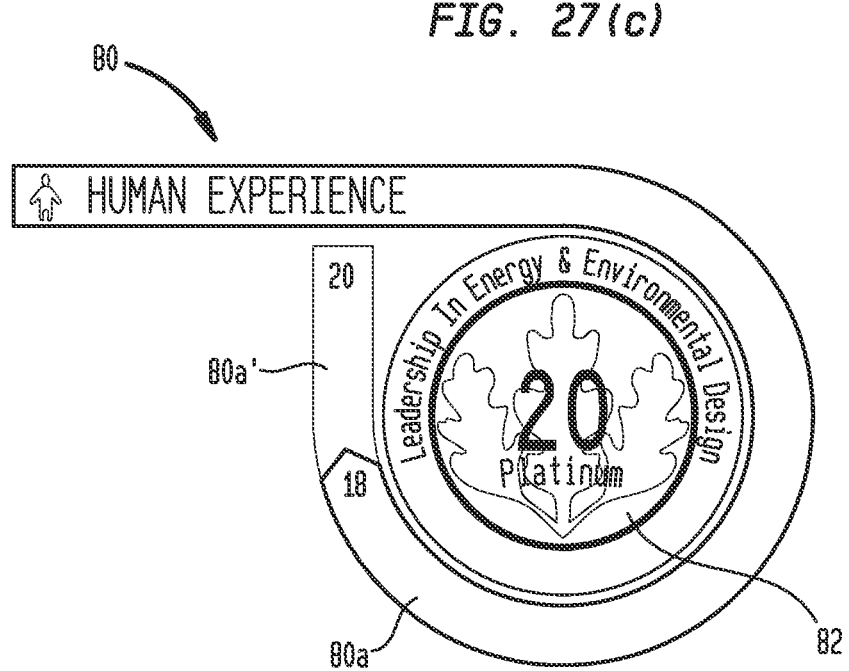
Figure 27D:
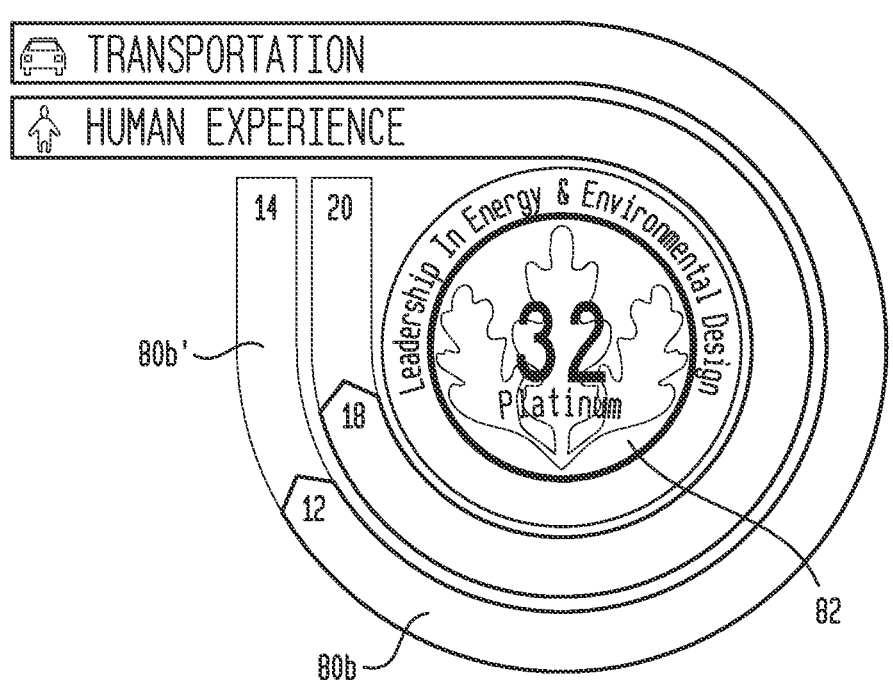
Figure 27E:
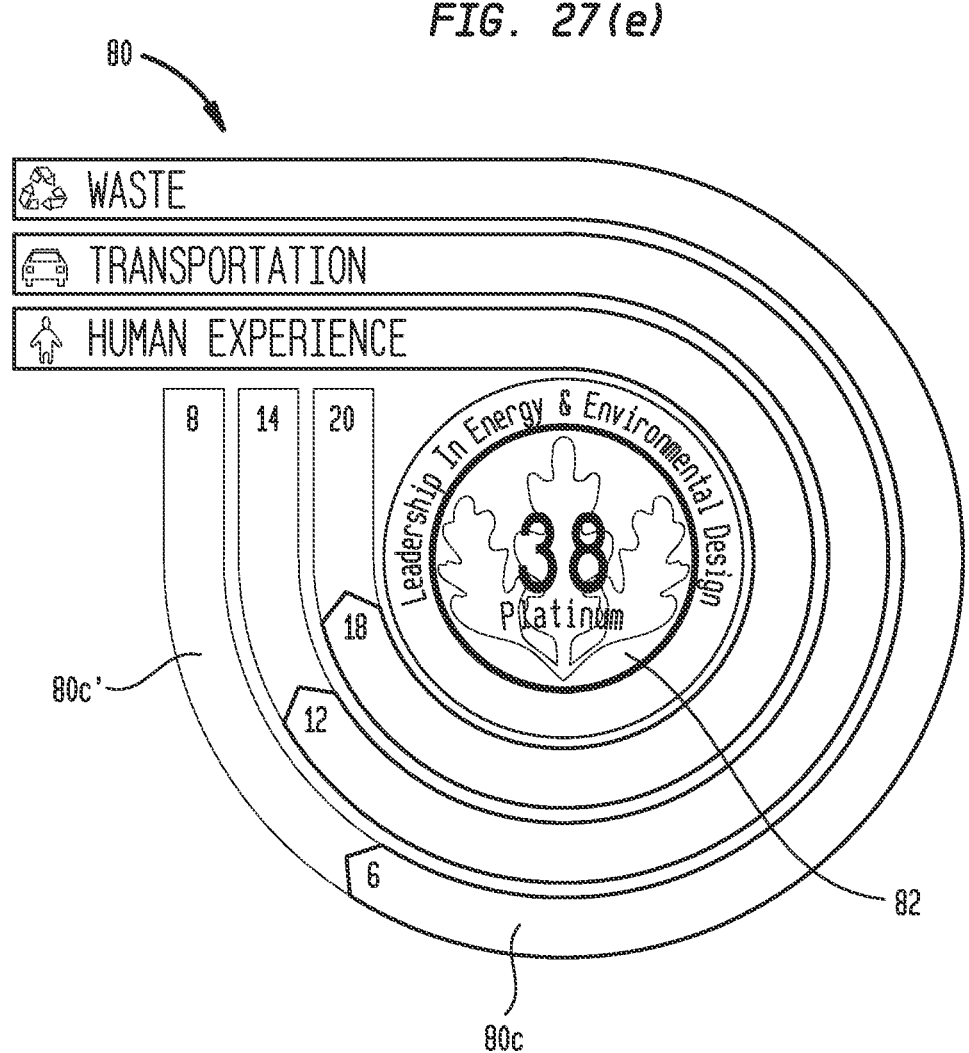
Figure 27F:
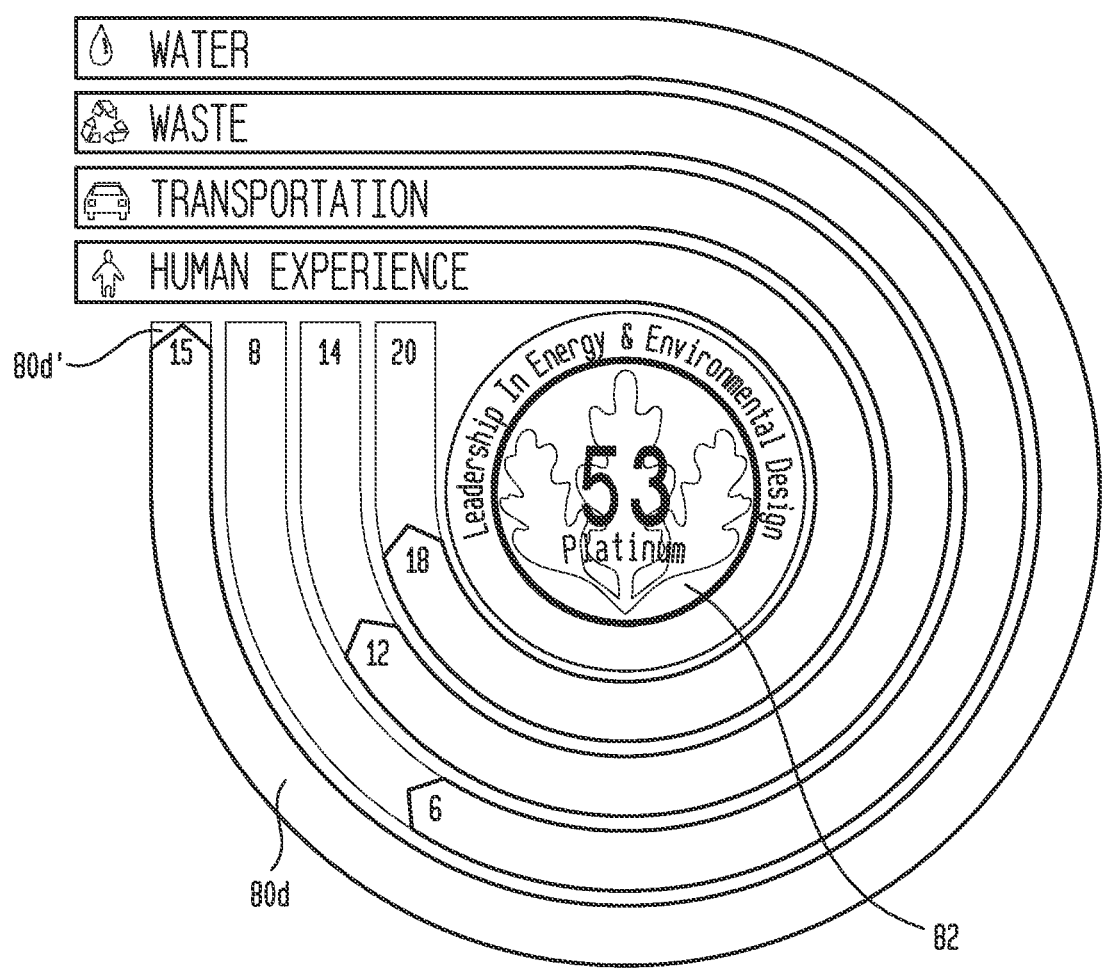
Figure 27G:
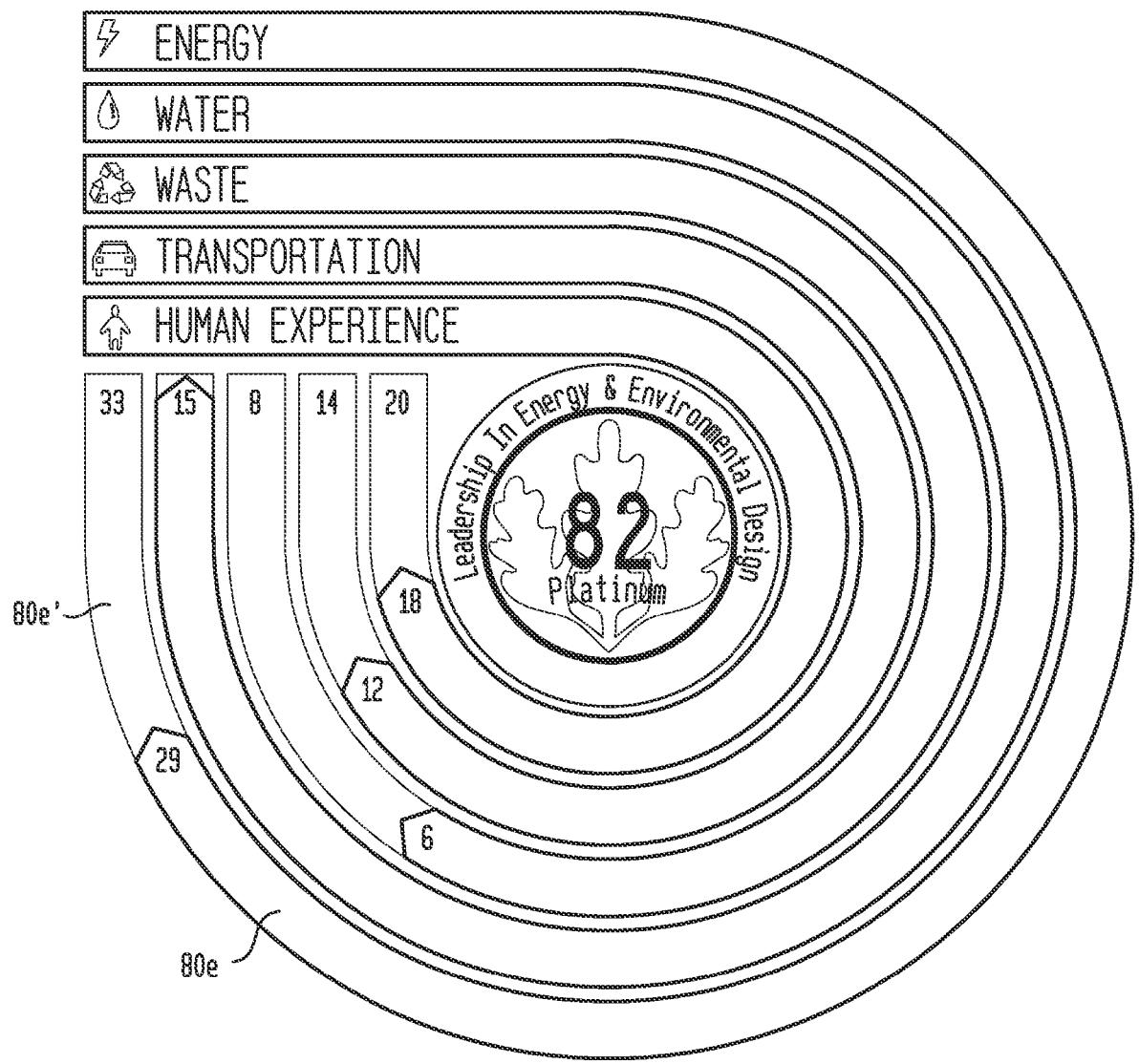
Figure 27H:
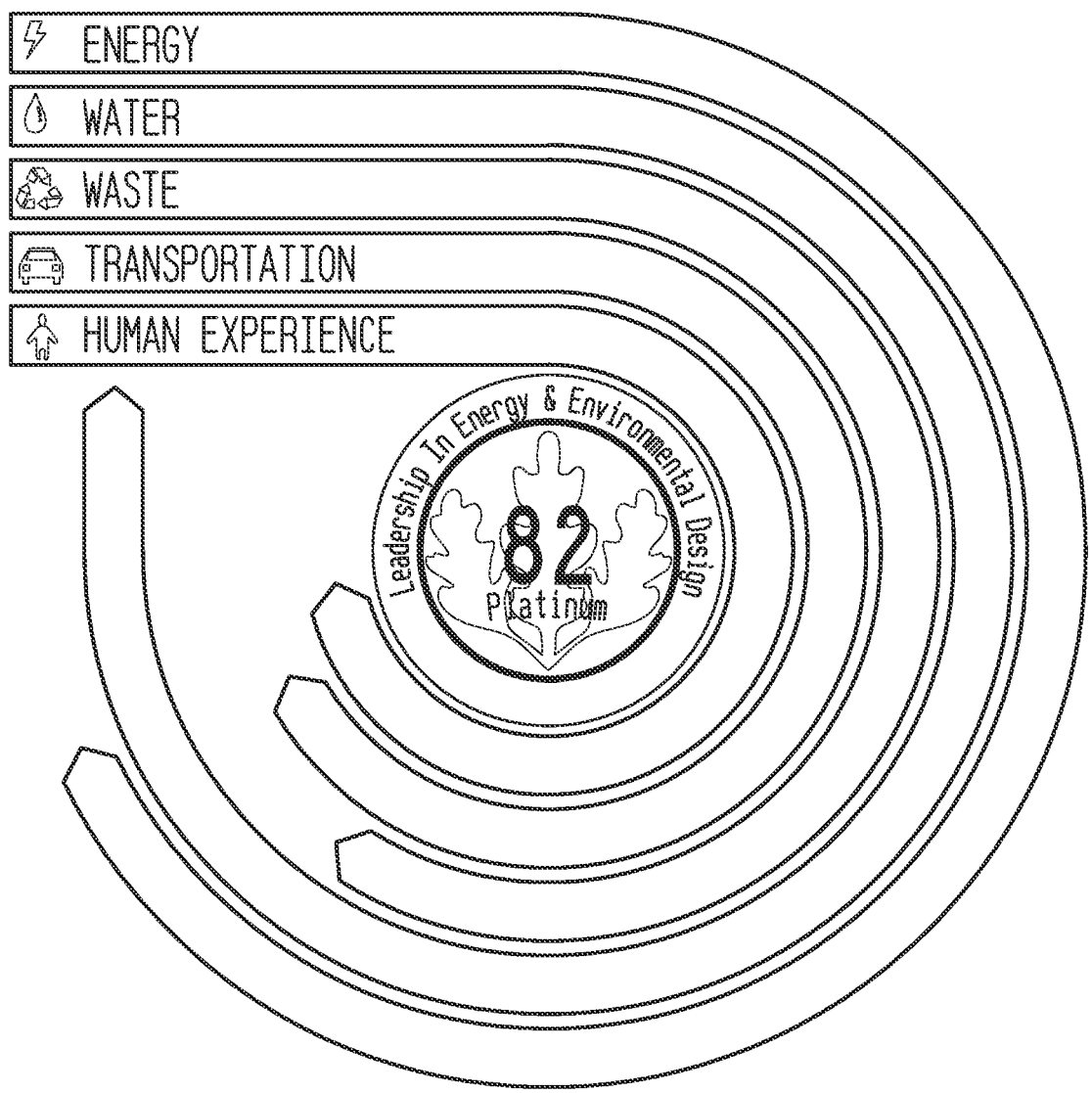
Figure 27:

FIGS. 27(*a*) through 27(*i*) show sequential partial views of animated displays shown on the display LDP 26 according to one embodiment. In FIG. 27(*a*), LEED logo 81 is first shown to a user on display 27.

In FIG. 27(*b*), an overall performance score 82 corresponding to the building or structure 1 within which LDP 26 is mounted or associated is next shown to a user on display 27.

In FIG. 27(*c*), and in addition to the overall performance score 82 corresponding to the building or structure 1 within which LDP 26 is mounted or associated, there are next shown first and second racetracks 80*a* and 80*a*' corresponding to human experience building performance scores, where an illustrative score of 18 corresponds to the first racetrack 80*a* and denotes the human experience score assigned to the particular building or structure 1 by CWS 50 (and to which LDP 26 corresponds), a possible illustrative potential top score of 20 corresponds to the second racetrack 80*a*', and the first racetrack 80*a* overlaps partially with second racetrack 80*a*'. In one embodiment of LDP 26, a user viewing display 27 sees racetrack 80*a* fill in along the path of racetrack 80*a*' until its terminus is reached. The terminus of racetrack 80*a* corresponds to the human experience score assigned to LDP 26 by CWS 50 for building or structure 1.

In FIG. 27(*d*), and in addition to the overall performance score 82 corresponding to the building or structure 1 within which LDP 26 is mounted or associated, and in addition to the first and second racetracks described above, there are next shown third and fourth racetracks 80*b* and 80*b*' corresponding to transportation building performance scores, where an illustrative score of 12 corresponds to the third racetrack 80*b* and denotes the transportation score assigned to the particular building or structure 1 by CWS 50 (and to which LDP 26 corresponds), a possible illustrative potential top score of 14 corresponds to the fourth racetrack 80*b*', and the third racetrack 80*b* overlaps partially with fourth racetrack 80*b*' 1. In one embodiment of LDP 26, a user viewing display 27 sees racetrack 80*b* fill in along the path of racetrack 80*b*' until its terminus is reached. The terminus of racetrack 80*b* corresponds to the transportation score assigned to LDP 26 by CWS 50 for building or structure 1.

In FIG. 27(*e*), and in addition to the overall performance score 82 corresponding to the building or structure 1 within which LDP 26 is mounted or associated, and in addition to the first through fourth racetracks described above, there are next shown fifth and sixth racetracks 80*c* and 80*c*' corresponding to waste building performance scores, where an illustrative score of 6 corresponds to the fifth racetrack 80*c* and denotes the waste score assigned to the particular building or structure 1 by CWS 50 (and to which LDP 26 corresponds), a possible illustrative potential top score of 8 corresponds to the sixth racetrack 80*c*', and the fifth racetrack 80*c* overlaps partially with sixth racetrack 80*c*'. In one embodiment of LDP 26, a user viewing display 27 sees racetrack 80*c* fill in along the path of racetrack 80*c*' until its terminus is reached. The terminus of racetrack 80*c* corresponds to the waste score assigned to LOP 26 by CWS 50 for building or structure 1.

In FIG. 27(*f*), and in addition to the overall performance score 82 corresponding to the building or structure 1 within which LDP 26 is mounted or associated, and in addition to the first through sixth racetracks described above, there are next shown seventh and eighth racetracks 80*d* and 80*d*' corresponding to water building performance scores, where an illustrative score of 15 corresponds to the seventh racetrack 80*d* and denotes the water score assigned to the particular building or structure 1 by CWS 50 (and to which LDP 26 corresponds), a possible illustrative potential top score of 15 corresponds to the eighth racetrack 80*d*', and the seventh racetrack 80*d* overlaps almost completely (but for the tip of the arrow of racetrack 80*d*) with eighth racetrack 80*d*'. In one embodiment of LDP 26, a user viewing display 27 sees racetrack 80*d* fill in along the path of racetrack 80*d*' until its terminus is reached. The terminus of racetrack 80*d* corresponds to the water score assigned to LDP 26 by CWS 50 for building or structure 1.

In FIG. 27(*g*), and in addition to the overall performance score 82 corresponding to the building or structure 1 within which LDP 26 is mounted or associated, and in addition to the first through eighth racetracks described above, there are next shown ninth and tenth racetracks 80*e* and 80*e*' corresponding to energy building performance scores, where an illustrative score of 29 corresponds to the fifth racetrack 80*d* and denotes the energy score assigned to the particular building or structure 1 by CWS 50 (and to which LDP 26 corresponds), a possible illustrative potential top score of 33 corresponds to the tenth racetrack 80*e*', and the ninth racetrack 80*e* overlaps with tenth racetrack 80*e*'. In one embodiment of LDP 26, a user viewing display 27 sees racetrack 80*e* fill in along the path of racetrack 80*e*' until its terminus is reached. The terminus of racetrack 80*e* corresponds to the energy score assigned to LDP 26 by CWS 50 for building or structure 1.

In FIG. 27(*h*), each of the first, third, fifth, seventh and ninth racetracks 80*a*, 80*b*, 80*c*, 80*d*, and 80*e* are shown without racetracks 80*a*', 80*b*', 80*c*', 80*d*', and 80*e*' appearing on display 27.

Finally, in FIG. 27(*i*), a LEED or other logo is shown on display 27 to conclude the animation. After the initial display of logo 81, overall score 82, and racetrack 80 in its various embodiments, the display animation sequence is continuously repeated, repeated according to a predetermined schedule, repeated when prompted by a user, or, by way of example, repeated when a capacitive or other sensor or switch operably connected to LDP 26 or dashboard 24 detects the presence or approach of a user who may view display 27.

The computer displays of building scores shown in FIGS. 24, 25(*a*), 25(*c*), and 27(*a*) through 27(*i*) represent but selected embodiments of the manner or style in which building scores and other building information may be displayed. Other embodiments not explicitly shown in the Figures hereof also contemplated. For example, and by way of non-limited example, such displays may present such scores or information in formats which employ bars, columns, rows, pie charts, icons, lines, rectangles, squares, triangles, tabs, charts, history charts, numbers, numeric data, letters, meters, docks, three-dimensional or perspective-view displays showing different types of scores, information or data, block diagrams, functional diagrams, radial or polar displays, fractal displays, constellation displays, shades of colours, relational positions, different sizes, keys, and indexes. Moreover, such displays may present such scores or information in formats which employ any combination, permutation, or modification of any of the display types described and shown herein, or that will otherwise become apparent to those skilled in the art after having read and understood the written description, figures and claims hereof.

The above-described embodiments should be considered as examples of the inventions described and disclosed herein, rather than as limiting the scope thereof. In addition to the foregoing embodiments, review of the detailed description and accompanying drawings will show that many other embodiments are contemplated that may not be explicitly disclosed or described herein. Accordingly, many combinations, permutations, variations and modifications of the foregoing embodiments will nevertheless fall within the spirit and scope of the various inventions described and disclosed herein. For example, cloud-based and distributed embodiments of CWS 50, LDP 26 and dashboard 24 are contemplated.

Additionally, the methods, systems, devices and components disclosed and described herein may be employed in building or structure monitoring, certification, or re-certification programs or systems other than those employed by USGBC, and are not restricted to a LEED building performance score displaying, monitoring, certification, or re-certification program or system.

Although various methods and techniques have been described as being implemented in software, similar techniques can be implemented in hardware, firmware, or the like. Example hardware implementations of LDP 26 and dashboard 24 include implementations within an application specific integrated circuit (ASIC), a field programmable gate array (FPGA), a programmable logic device, specifically designed hardware components, one or more processors, or any combination thereof. If implemented in software, a computer readable medium stores computer readable instructions, e.g., program code, that can be executed by a processor, DSP or other suitable computing device to carry out one of more of the techniques described above. For example, the computer readable medium can comprise random access memory (RAM), read-only memory (ROM), non-volatile random access memory (NVRAM), electrically erasable programmable read-only memory (EEPROM), flash memory, or the like. The computer readable medium can comprise computer readable instructions that when executed carry out one or more of the techniques described herein. The disclosed embodiments are presented for purposes of illustration and not limitation.

We claim:

1. A building performance scoring system, comprising:

a central web server ("CWS") configured to operate in conjunction with a remote device configured to display at least one of building or structure performance data and building or structure performance scores associated with such data, the data and scores corresponding to a predetermined building or structure within which the remote device is mounted, with which the remote device is associated, or to which the remote device is operably connected, the CWS comprising means for storing the building performance data and the building performance scores associated with the predetermined building or structure, means for updating or calculating the building performance data and building performance scores associated with the predetermined building or structure, and means for transferring at least one of the updated or calculated building performance data and the updated or calculated building performance scores to the remote device via the internet in response to an authorized request generated by the remote device and communicated to the CWS via the internet;

the remote device comprising at least one processor, first storage means for storing at least one of the building or structure performance data and the building or structure performance scores, the first storage means being operably connected to or included in the processor, second storage means for storing display programming instructions corresponding to at least one of the building or structure performance data and the building or structure performance scores, the second storage means being operably connected to or included in the processor, and a display operably connected to the processor, one of the first and second storage means being pre-loaded with one or more authorization codes that permit at least partial access to the CWS and at least one of the performance data and the performance scores calculated by or stored in the CWS, the remote device being configured to send the request for at least one of the performance data and the performance scores via the internet from a dynamic plaque or dashboard to the CWS;

wherein: (a) the performance data or performance scores comprise at least three of water data or scores, energy data or scores, human experience data or scores, transportation data or scores, and waste data or scores, (b) the remote device, including the processor, the first storage means, the second storage means, and the display thereof, are configured to visually show on the display at least the performance scores; (c) the CWS is configured to authorize a validity of the request from the device before permitting the building performance data and the building performance scores to be transferred to the remote device in response to the request; (d) the CWS is configured to perform a benchmark analysis to generate benchmark data using anonymous data from buildings or structures similar to the predetermined building or structure; (e) the CWS is configured to calculate the building performance scores corresponding to the predetermined building or structure using the benchmark data, and (f) the CWS is further configured to send the updated or calculated building performance scores to the remote device.

2. The system of claim 1, wherein the remote device is further configured to show the performance scores on the display such that at least some of the scores displayed on the display have their own icons, segments or paths corresponding thereto.

3. The system of claim 2, wherein the icons, segments or paths are straight, curved, circular, semi-circular, elliptical, or arrowhead-shaped.

4. The system of claim 2, wherein at least one of the length, width, thickness, color, hue, saturation, darkness, lightness, brightness, brilliance, dullness, contrast, intensity, density or pattern of each icon, segment or path is proportional to the building performance score corresponding thereto.

5. The system of claim 1, wherein the CWS is further configured to transfer display animation code or instructions to the remote device in response to receiving an authorized request therefrom.

6. The system of claim 1, wherein the CWS is further configured to respond to a request made via the Internet by the remote device using a web browser.

7. The system of claim 1, wherein the remote device is configured to notify an owner or manager of the predetermined building or structure if a building performance score falls below a predetermined thresholds.

8. The system of claim 1, wherein the remote device is one of a display plaque and a dashboard device.

9. The system of claim 1, further comprising at least one building or structure data acquisition device configured to receive input signals from a plurality of sensors located in or around the predetermined building or structure, the input signals representing building or structure performance data corresponding to the predetermined building or structure and to at least three of water data, energy data, human experience data, transportation data, and waste data.

10. The system of claim 1, wherein the remote device is further configured to download, store and execute animation code or instructions from the CWS that correspond to the building performance scores.

11. The system of claim 1, wherein the remote device is configured to launch a web browser to communicate with the DNS via the internet, and the processor, memory or storage devices associated with the device are loaded with one or more executable software modules configured to display at least one of the building performance data and the building performance scores obtained from the CWS.

* * * * *